US010469278B2

(12) United States Patent
Suthar et al.

(10) Patent No.: US 10,469,278 B2
(45) Date of Patent: Nov. 5, 2019

(54) METHOD AND DEVICE FOR MULTICAST CONTENT DELIVERY

(71) Applicant: Cisco Technology, Inc., San Jose, CA (US)

(72) Inventors: Om Prakash Suthar, Bolingbrook, IL (US); Rajiv Asati, Morrisville, NC (US); Nagendra Kumar Nainar, Morrisville, NC (US); Carlos M. Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 79 days.

(21) Appl. No.: 15/792,609

(22) Filed: Oct. 24, 2017

(65) Prior Publication Data
US 2019/0123922 A1 Apr. 25, 2019

(51) Int. Cl.
*H04L 12/18* (2006.01)
*H04L 12/26* (2006.01)
(Continued)

(52) U.S. Cl.
CPC .......... *H04L 12/185* (2013.01); *H04L 12/189* (2013.01); *H04L 12/1822* (2013.01);
(Continued)

(58) Field of Classification Search
CPC ............... H04L 12/185; H04L 29/0653; H04L 12/1822; H04L 12/189; H04L 45/74; H04L 12/1877
See application file for complete search history.

(56) References Cited

U.S. PATENT DOCUMENTS 9,432,205 B2 8/2016 Tian et al.
9,544,240 B1 1/2017 Przygienda et al.
(Continued)

FOREIGN PATENT DOCUMENTS

WO WO-2017141076 A1 * 8/2017 ............. H04L 12/18

OTHER PUBLICATIONS

Technical Specification, "3rd Generation Partnership Project; Technical Specification Group Services and System Aspects; System Architecture for the 5G System; Stage 2 (Release 15)", 3GPP TS 23.501, V1.4.0, Sep. 2017, 151 pages.
(Continued)

*Primary Examiner* — Kiet Tang

(57) ABSTRACT

In accordance with various implementations, a method is performed at a multicast gateway node within an operator network, where the multicast gateway node includes one or more processors, non-transitory memory, an ingress interface, and one or more egress interfaces. The method includes determining a multicast identifier for a user device in response to obtaining a registration request associated with the user device. The method also includes generating a header for a multicast data stream based at least in part on the multicast identifier in response to obtaining a multicast flow join request. The method further includes populating a packet associated with the multicast data stream with the header. The method further includes forwarding the packet to the user device via a portion of the one or more egress interfaces, where the portion of the one or more egress interfaces is associated with the user device.

20 Claims, 12 Drawing Sheets

(51) Int. Cl.
*H04W 48/16* (2009.01)
*H04L 12/24* (2006.01)
*H04L 12/741* (2013.01)
*H04L 29/06* (2006.01)

(52) U.S. Cl.
CPC ...... *H04L 12/1877* (2013.01); *H04L 29/0653* (2013.01); *H04L 45/74* (2013.01)

(56) References Cited

U.S. PATENT DOCUMENTS

| | | | |
|---|---|---|---|
| 2011/0170542 A1* | 7/2011 | Liu | H04L 12/18 370/390 |
| 2015/0139228 A1 | 5/2015 | Wijnands et al. | |
| 2016/0119159 A1 | 4/2016 | Zhao et al. | |
| 2016/0262085 A1* | 9/2016 | Park | H04W 48/16 |
| 2016/0277463 A1 | 9/2016 | Nagarajan et al. | |
| 2017/0289270 A1* | 10/2017 | Li | H04L 41/0803 |
| 2018/0198698 A1* | 7/2018 | Rife | H04L 43/106 |

OTHER PUBLICATIONS

Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401, V15.1.0, Sep. 2017, pp. 1-100.

Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401, V15.1.0, Sep. 2017, pp. 101-200.

Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401, V15.1.0, Sep. 2017, pp. 201-300.

Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401, V15.1.0, Sep. 2017, pp. 301-397.

IJ. Wijnands, Ed., et al., "Multicast using Bit Index Explicit replication", draft-ietf-bier-architecture-07, Internet Engineering Task Force, Internet-Draft, Jun. 21, 2017, 38 pages.

Technical Specification, "3rd Generation Partnership Project; Technical Specification Group Services and System Aspects; Multimedia Broadcast/Multicast Service (MBMS); Architecture and functional description (Release 9)", 3GPP TS 23.246, V9.5.0, Jun. 2010, 65 pages.

Giuseppe Araniti, et al., "Multicasting over Emerging 5G Networks: Challenges and Perspectives", IEEE Network, vol. 31, Issue: 2, Mar./Apr. 2017, 10 pages.

* cited by examiner

METHOD AND DEVICE FOR MULTICAST CONTENT DELIVERY

TECHNICAL FIELD

The present disclosure generally relates to content delivery through data networks, and in particular, to systems, methods, and devices for multicast content delivery.

BACKGROUND

Multicast is a form of group communication in which information is transmitted to multiple users over a network from a source node in the network. Applications that make use of multicast include, for example, video conferencing, corporate communications, distance learning, and distribution of software, stock quotes, and news.

For Long-Term Evolution (LTE) (sometimes also referred to as 4G) mobile access networks, multicast is a major challenge due to complex control signaling over radio interfaces. Several hosts receive a single data stream and perform complex instructions to differentiate between several multicast groups, where each multicast group includes multiple users each with different user devices. Similar problems also carry over to 5G mobile access networks.

Additionally, managing multicast communications between a multicast source and end users connected to a mobile access network is another challenge. The mobile access network includes a mobility management entity (MME) or access management function (AMF) and gateway nodes to manage and transmit multicast communications including user information associated with user devices. These multicast communications are stored and maintained in a multicast tree in real-time. Therefore, managing multicast communications between mobile access networks, multicast sources, and end users is a complex and resource-intensive process.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
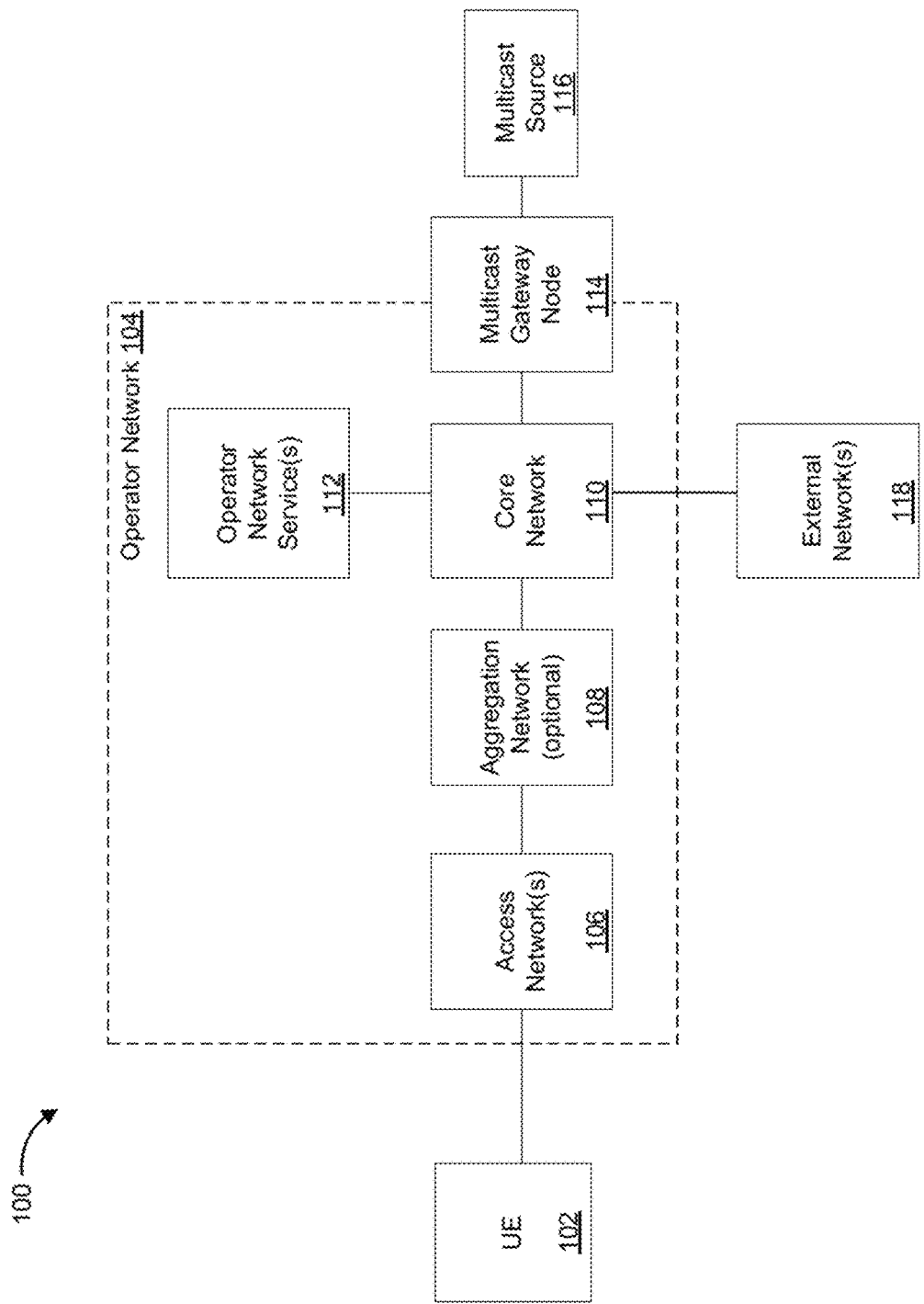
FIG. 1 is a block diagram of an example data delivery environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for modifying user device registration procedures for multicast data stream delivery. For example, in some implementations, a method is performed at a multicast gateway node within an operator network, where the multicast gateway node includes one or more processors, non-transitory memory, an ingress interface, and one or more egress interfaces. The method includes determining a multicast identifier for a user device in response to obtaining a registration request associated with the user device. The method also includes generating a header for a particular multicast data stream based at least in part on the multicast identifier for the user device in response to obtaining a multicast flow join request from the user device that specifies the particular multicast data stream. The method further includes populating a packet associated with the particular multicast data stream with the header. The method further includes forwarding the packet of the multicast data stream to the user device via a portion of the one or more egress interfaces, where the portion of the one or more egress interfaces is associated with the user device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Example Embodiments

Multicast is a form of group communication in which information is transmitted to multiple users over a network from a source node. However, multicast is a major challenge for LTE and 5G mobile access networks due to complex control signaling over radio interfaces. Implementations of a proposed solution described herein include devices, systems, and methods for modifying user device registration procedures for multicast data stream delivery.

Additionally, multicast data streams tailored to user devices associated with an interested user are transmitted according to one of a number of forwarding schemes. According to one forwarding scheme, multicast data streams are forwarded to each access node serving user devices associated with one or more users interested in the multicast data stream. According to another forwarding scheme, a same single multicast data stream is forwarded to all access nodes and all user devices. As such, the particular multicast data stream is forwarded to some user devices associated with one or more users uninterested in the multicast data stream.

FIG. 1 is a block diagram of an example data delivery environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data delivery environment 100 includes an operator network 104 that receives and transmits data between user equipment (UE) 102 and a multicast source 116. In some implementations, the operator network 104 also receives data from and transmits data to an external network 118.

In some implementations, the UE 102 includes a suitable combination of hardware (physical or virtualized), software, and/or firmware. As will be appreciated by one of ordinary skill in the art, although FIG. 1 depicts one UE 102, the data delivery environment 100 includes an arbitrary number of UEs in various other implementations. For example, the UE 102 corresponds to a desktop computer, laptop computer, mobile phone, tablet, wearable computing device, set-top box (STB), over-the-top (OTT) box, gaming console, or the like.

In some implementations, the operator network 104 includes one or more access networks (ANs) 106, a core network 110, one or more operator network services 112, and a multicast gateway node 114. In some implementations, the operator network 104 optionally includes an aggregation network 108. In some implementations, the operator network 104 corresponds to a telecommunications service provider that provides wireless communication functionalities to a user/subscriber associated with the UE 102 such as a mobile network operator (MNO) or mobile virtual network operator (MVNO) that provides mobile access to content and communications. In some implementations, the operator network 104 corresponds more generally to a service provider (SP) that provides mobile access, fixed access, satellite access, or the like to content and communications.

In some implementations, the operator network 104 also receives and transmits data to one or more external networks 118, which optionally includes receiving data from and transmitting data to the Internet, content delivery network (CDN) servers, application servers, or the like.

In some implementations, at least one of the one or more ANs 106 correspond to radio access networks (RANs) that implement radio access technology to provide connectivity via wireless communication to the UE 102 communicatively connected to the operator network 104. In one example, at least one of the one or more ANs 106 corresponds to a Long-Term Evolution (LTE) mobile access network (sometimes also referred to as 4G) that includes evolved node B (eNodeB) access nodes and the like. In another example, at least one of the one or more ANs 106 correspond to a 5G mobile access that includes 5G base stations and the like.

In some implementations, at least one of the one or more ANs 106 implements non-radio access technology to provide connectivity via wired or wireless communication to the UE 102 communicatively connected to the operator network 104. For example, the non-radio access technology includes an IEEE 802.11x Wi-Fi network, a fiber optic network, an IEEE 802.3x Ethernet network, a satellite network, or the like.

In some implementations, at least one of the one or more ANs 106 implements heterogeneous access technology via wired or wireless communication to the UE 102 communicatively connected to the operator network 104. For example, the heterogeneous access technology includes a combination of radio access and non-radio access technologies.

In some implementations, the core network 110 provides IP routing and forwarding for unicast and/or multicast data streams between end points. For example, the end points include the one or more operator network services 112, the one or more external networks 118, the multicast source 116, the UE 102, and/or the like.

In some implementations, the one or more operator network services 112 include wireless communication services to control the elements of the operator network 104 in order to monitor and deliver services to an end user (e.g., the UE 102). As one example, the one or more operator network services 112 optionally include radio spectrum allocation management, infrastructure and networking management, Quality of Service (QoS) policy enforcement, billing services, customer support services, security auditing services, infrastructure and networking maintenance, and/or the like. In another example, the one or more operator network services 112 include content delivery services such as an Internet Protocol (IP) multimedia subsystem (IMS). In yet another example, the one or more operator network services 112 include communication services such as voice-over Long-Term Evolution (VoLTE) or voice-over Internet Protocol (VoIP).

In some implementations, the aggregation network 108 combines multiple network connections in parallel to increase throughput and to provide redundancies in case one of the network connections fails.

In some implementations, the operator network 104 includes a multicast gateway node 114 that serves as an interface node between the operator network 104 and a multicast source 116. In some implementations, the multicast gateway node 114 includes a suitable combination of hardware (physical or virtualized), software, and/or firmware to maintain communication protocols between the operator network 104 and the multicast source 116. For example, the multicast gateway node 114 is configured to translate and map gateway interconnects for networks with different protocol technologies by performing protocol conversions. Further, in another example, the networks with different protocol technologies include the operator network 104 and the multicast source 116.

In some implementations, the multicast source 116 transmits a multicast data stream to the multicast gateway node 114. Further, in some implementations, the multicast source 116 transmits the multicast data stream to the user/subscriber associated with the UE 102. For example, the multicast data stream includes video, audio, and/or the like.

Figure 2:
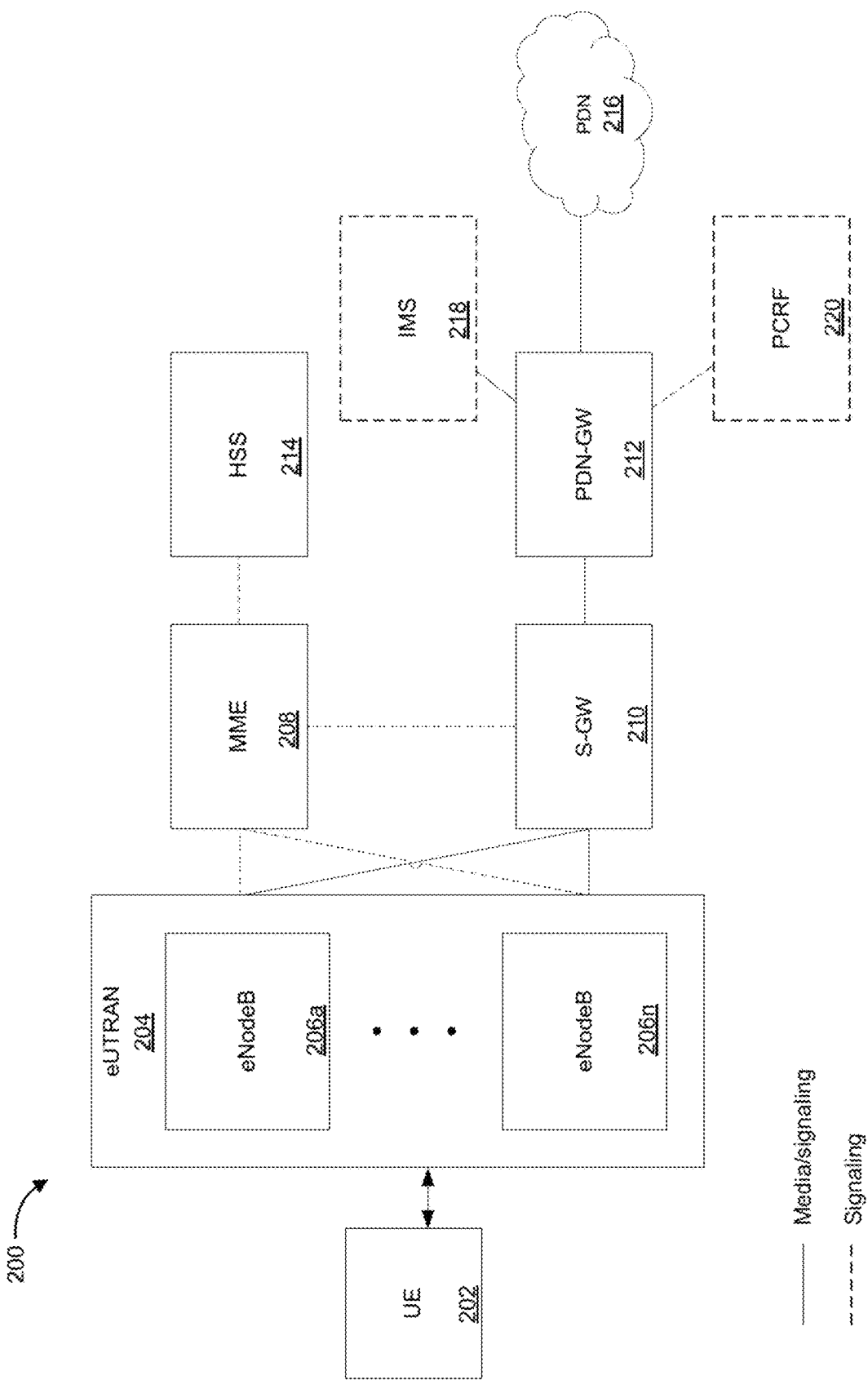
FIG. 2 is a block diagram of an example operator network in accordance with some implementations.

FIG. 2 is a block diagram of an example operator network 200 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operator network 200 utilizes a long-term evolution (LTE) architecture, sometimes simply called 4G architecture. The operator network 200 communicates with a user equipment (UE) 202 (e.g., the UE 102 of FIG. 1). According to some implementations, as shown in FIG. 2, the operator network 200 includes an evolved UMTS terrestrial radio access network (EUTRAN) 204 that includes one or more evolved node-Bs (eNodeBs) 206a, . . . , 206n, a mobility management entity (MME) 208, a serving-gateway (S-GW) 210, a packet data network gateway (PDN-GW) 212, a home subscriber server (HSS) 214, and a packet data network (PDN) 216. According to some implementations, the operator network 200 optionally includes an IP multimedia subsystem (IMS) 218. According to some implementations, the operator network 200 also optionally includes a policy and charging rules function (PCRF) 220.

In some implementations, the EUTRAN 204 corresponds to a RAN that includes one or more eNodeBs 206a, . . . , 206n and provides a communication pathway between the UE 202 and the MME 208 or the S-GW 210. eNodeBs 206a, . . . , 206n correspond to access nodes that provide communications between the EUTRAN 204 and the UE 202. According to some implementations, the EUTRAN 204 is configured to operate similarly to one of the one or more ANs 106 in FIG. 1.

In some implementations, the MME 208 is configured to initiate paging and authentication of the mobile device (e.g., the UE 202). The MME 208 retains the location information for each user and selects the appropriate gateway. In some implementations, the MME 208 connects with a respective one of the one or more eNodeBs 206a, . . . , 206n. Further, in some implementations, the MME 208 also communicates with the HSS 214, which serves as a master user database that supports the IMS network entities that handle calls and sessions.

In some implementations, the EUTRAN 204 communicates with the S-GW 210 and sends packets of data (e.g., video, audio, and/or the like) through the S-GW 210 to the PDN-GW 212. Further, in some implementations, the PDN-GW 212 is configured to be the point of interconnect between the external IP networks (e.g., the PDN 216) and routes packets of data to and from the PDN 216. In some implementations, the S-GW 210 communicates with the MME 208 to access user information to determine the appropriate gateway to transmit packets of data. As will be appreciated by one of ordinary skill in the art, although FIG. 2 depicts one PDN 216, the operator network 200 includes an arbitrary number of PDNs in various other implementations. In some implementations, the PDN-GW 212 optionally communicates with IMS 218 and PCRF 220.

In some implementations, the operator network 200 optionally includes the IMS 218, which is configured to control and deliver multimedia communications (e.g., video, audio, messages, and/or the like) across a data network.

In some implementations, the operator network 200 optionally includes the PCRF 220, which manages policy decisions and operator-defined charging rules associated with the data flow. For example, policy decisions and charging rules are based at least in part by QoS setting information for a user session, data flow detection, policy enforcement, flow-based charging, and/or the like.

Figure 3:
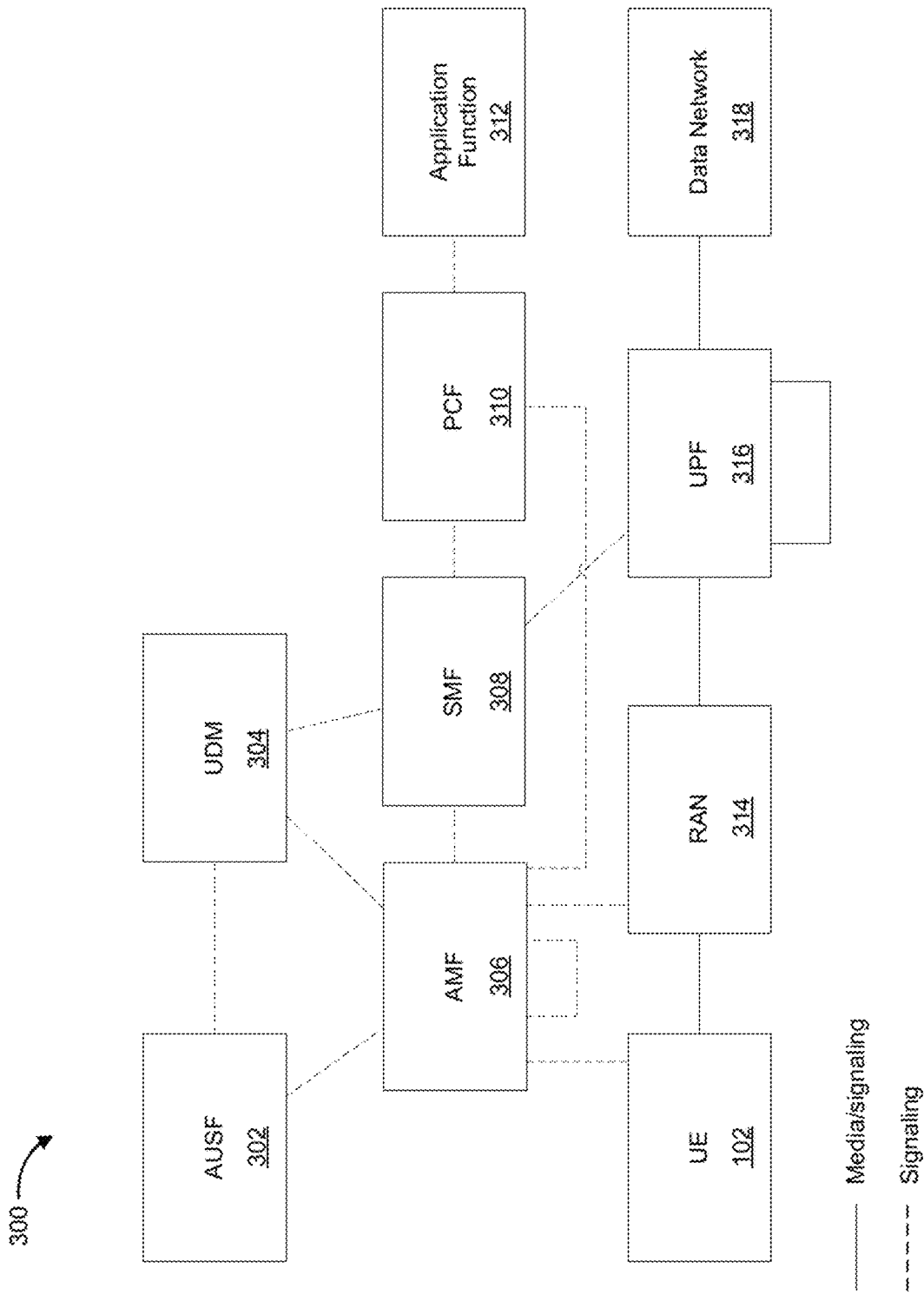
FIG. 3 is a block diagram of an example operator network in accordance with some implementations.

FIG. 3 is a block diagram of an example operator network 300 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operator network 300 utilizes a 5G architecture. According to some implementations, as shown in FIG. 3, the operator network 300 includes a user equipment (UE) (e.g., the UE 102 in FIG. 1), an authentication server function (AUSF) module 302, a unified data management (UDM) module 304, a core access and mobility management function (AMF) module 306, a session management function (SMF) module 308, a policy control function (PCF) module 310, an application function module 312, a RAN 314, a user plane function (UPF) module 316, and a data network 318.

In some implementations, the AUSF 302 is configured to facilitate authentication of an entity that attempts to access a network. As shown in FIG. 3, the AUSF 302 is communicatively coupled to the UDM 304 and the AMF 306. For example, the AUSF 302 is configured to perform security and privacy processes, such as data isolation between network slices, encryption/decryption, and/or the like.

In some implementations, the UDM 304 is configured to create a unified development and delivery environment that provides the UE 102 with access to consistent, accurate, and timely data. As shown in FIG. 3, the UDM 304 is communicatively coupled to the AUSF 302, the AMF 306, and the SMF 308.

In some implementations, the AMF 306 is configured to initiate paging and authentication of the mobile device (e.g., the UE 202). As shown in FIG. 3, the AMF 306 is communicatively coupled to the UE 102, the RAN 314, the AUSF 302, and the UDM 304. In some implementations, the AMF 306 is a user-plane function that includes mobile management capabilities. For example, the AMF 306 is configured to operate similarly to the MME 208 in FIG. 2.

In some implementations, the SMF 308 is configured to provide users/subscribers an option to save and restore sessions. As shown in FIG. 3, the SMF 308 is communicatively coupled to the UDM 304, the AMF 306, the PCF 310, and the UPF 316. For example, the SMF 308 is configured to save and restore one or more initial states associated with one or more applications. Further, for example, the initial states include the name of an open file, a displayed image, a video in progress, and/or the like.

In some implementations, the PCF 310 is configured to determine policy rules in a multimedia network. As shown in FIG. 3, the PCF 310 is communicatively coupled to the AMF 306, the SMF 308, and the application function module 312. For example, the PCF 310 designates policy in real-time via software.

In some implementations, the application function module 312 is configured to perform quality control for specific applications operating within a network. As shown in FIG. 3, the application function module 312 is communicatively coupled to the PCF 310. For example, quality control corresponds to evaluating QoS related to performance.

In some implementations, the RAN 314 implements radio access technology to provide connectivity via wireless communication to the UE 102 connected to the operator network 300. For example, the RAN 314 corresponds to a 5G mobile access network where the RAN 314 includes 5G base stations and the like. According to some implementations, the RAN 314 is configured to operate similarly to one of the one or more ANs 106 in FIG. 1. As shown in FIG. 3, the RAN 314 is communicatively coupled to the UE 102, the AMF 306, and the UPF 316.

In some implementations, the UPF 316 is configured to carry the traffic in the operator network 300. As shown in FIG. 3, the UPF is communicatively coupled to the RAN 314, the SMF 308, and the data network 318. In some implementations, the UPF 316 forwards traffic to a next-hop along the path to the selected destination data network (e.g., the data network 318). In some implementations, the data plane packets are transmitted through a delivery node (e.g., a router, a switch, and/or the like). To that end, the delivery node is configured to dispose of incoming and outgoing packets.

In some implementations, the data network 318 includes a router, switches, and/or the like. In some implementations, the data network 318 provides IP routing and forwarding for packets between end points. For example, the data network 318 corresponds to a portion of an operator network (e.g., the core network 110 of the operator network 104 in FIG. 1).

Figure 4:
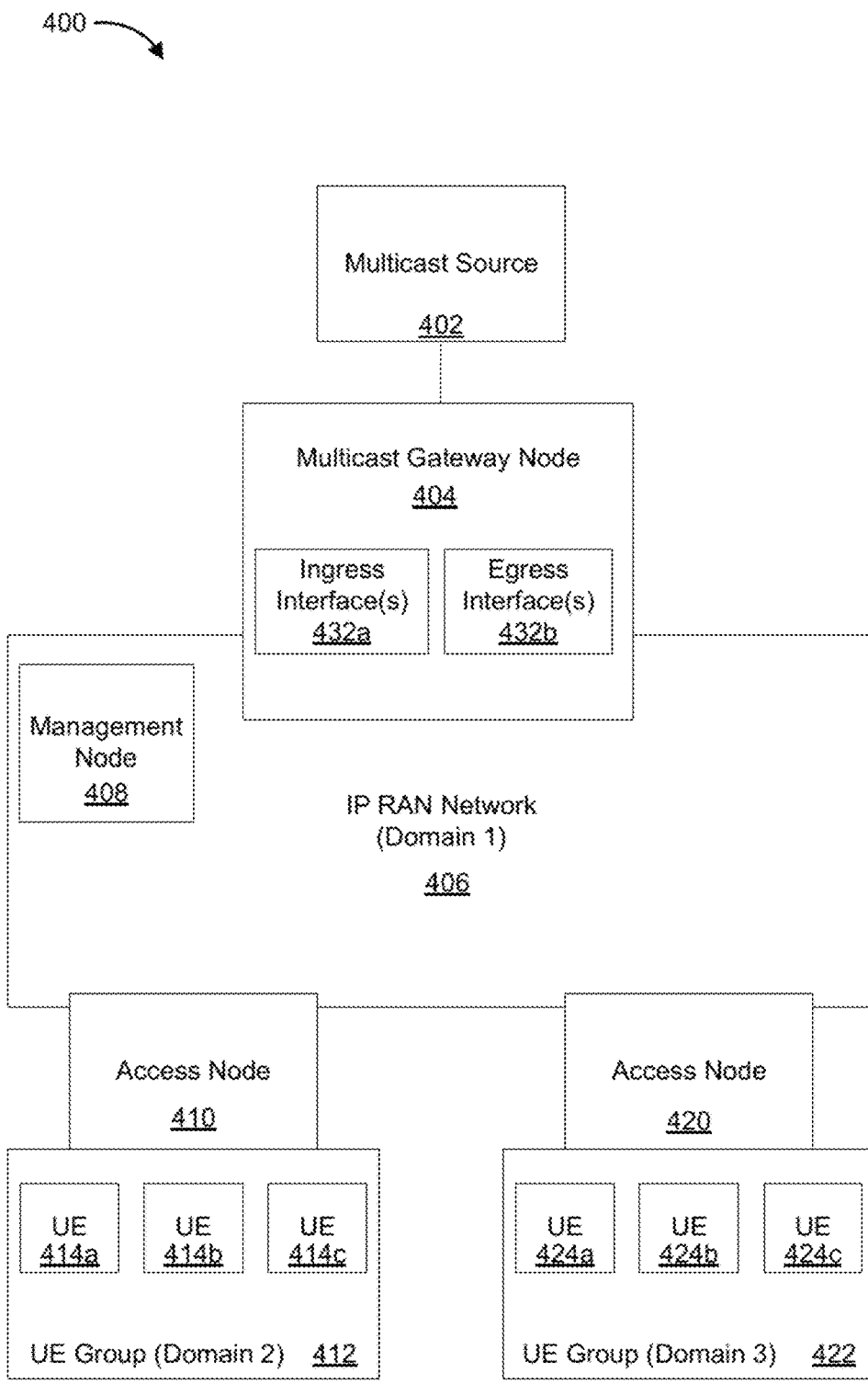
FIG. 4 is a simplified block diagram of a multicast environment in accordance with some implementations.

FIG. 4 is a simplified block diagram of a multicast environment 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the multicast environment 400 includes a multicast source 402, a multicast gateway node 404 (e.g., similar to and adapted from the multicast gateway node 114 in FIG. 1), an IP RAN network 406 (domain 1), an access node 410, an access node 420, a UE group 412 (domain 2), and a UE group 422 (domain 3).

In some implementations, the multicast gateway node 404 is an intermediary between the multicast source 402 and user equipment (UE) (e.g., UE 414a, UE 414b and UE 414c in UE group 412 (domain 2), and UE 424a, UE 424b and UE 424c in UE group 422 (domain 3)). As will be appreciated by one of ordinary skill in the art, although FIG. 4 depicts two UE groups 412 and 422, the multicast environment 400 includes an arbitrary number of UE groups in various other implementations. In some implementations, the multicast gateway node 404 is included within an operator network (e.g., the multicast gateway node 114 of the operator network 104 in FIG. 1).

In some implementations, the multicast gateway 404 includes one or more ingress interfaces 432a. In some implementations, the one or more ingress interfaces 432a provide an interface between the multicast gateway node 404 and the multicast source 402 provided to obtain a multicast data stream. For example, in some implementations, the one or more ingress interfaces 432a operate according to a border gateway protocol (BGP).

In some implementations, the multicast gateway node 404 includes one or more egress interfaces 432b. In some implementations, the one or more egress interfaces 432b provide an interface between the multicast gateway node 404 and one or more delivery nodes of the operator network (e.g., the core network 110 of the operator network 104 from FIG. 1). For example, in some implementations, the one or more egress interfaces 432b are communicatively coupled to delivery nodes, such as routers, switches, and/or the like, within the core network (e.g., core network 110 from FIG. 1). In some implementations, the one or more egress interfaces 432b operate according to an interior gateway protocol (IGP).

In some implementations, the IP RAN network 406 (domain 1) includes the multicast gateway node 404, the access node 410, and the access node 420. In some implementations, the IP RAN network 406 (domain 1) corresponds to an operator network (e.g., the operator network 104 in FIG. 1), which optionally corresponds to an MNO, MVNO, or SP. In some implementations, the IP RAN network 406 (domain 1) includes a management node 408, which manages information associated with a user. For example, when the IP RAN network 406 (domain 1) includes the LTE architecture shown in FIG. 2, the management node 408 corresponds to the MME 208 in FIG. 2. In another example, when the IP RAN network 406 (domain 1) includes the 5G architecture shown in FIG. 3, the management node 408 corresponds to the AMF 306 in FIG. 3.

In some implementations, the access node 410 includes a suitable combination of hardware (physical or virtualized), software, and/or firmware that provides communication between the IP RAN network 406 (domain 1) and the UE group 412 (domain 2). In some implementations, the access node 420 includes a suitable combination of hardware (physical or virtualized), software, and/or firmware that provides communication between the IP RAN network 406 (domain 1) and the UE group 422 (domain 3). In some implementations, the access nodes 410 and 420 correspond to eNodeBs (e.g. eNodeB 206a and eNodeB 206b in FIG. 2). As will be appreciated by one of ordinary skill in the art, although FIG. 4 depicts two access nodes 410 and 420, the multicast environment 400 includes an arbitrary number of access nodes in various other implementations.

Figure 5:
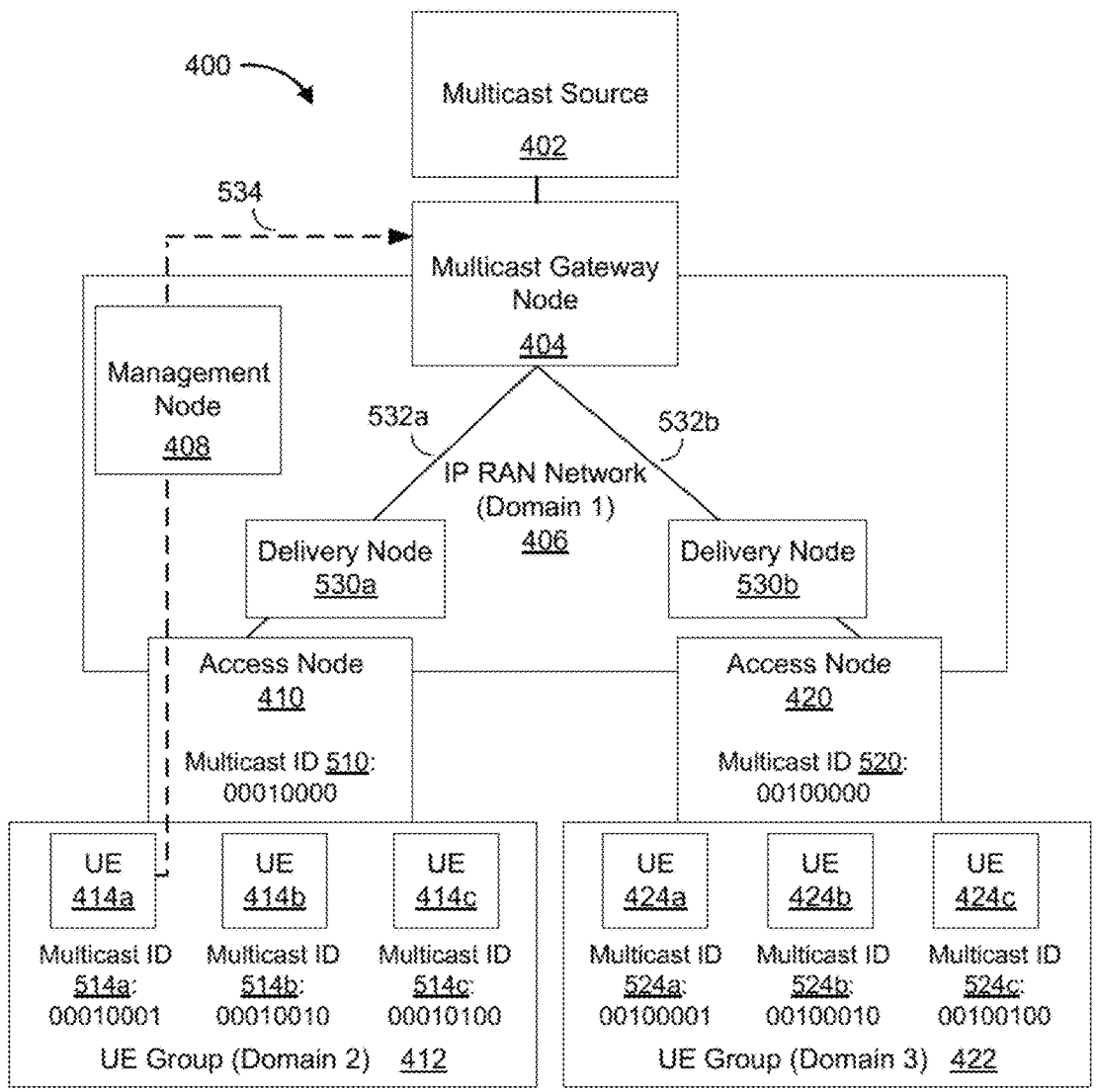
FIG. 5 illustrates operations and data structures associated with the multicast environment illustrated in FIG. 4 in accordance with some implementations.

FIG. 5 illustrates operations and data structures associated with the multicast environment 400 in FIG. 4 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. Elements common to FIGS. 4 and 5 include common reference numbers, and only the differences between FIGS. 4 and 5 are described herein for the sake of brevity. To that end, as a non-limiting example, the multicast gateway node 404 maintains a multicast identifier table 550 in order to track UEs and their associated multicast identifiers (IDs).

In some implementations, the IP RAN network 406 (domain 1) includes delivery nodes 530a and 530b. In some implementations, the delivery nodes 530a and 530b are configured to forward data packets received at ingress interfaces (e.g., the one or more ingress interfaces 432a in FIG. 4) of the multicast gateway node 404 from the multicast source 402. For example, the data packets include video content, audio content, and/or the like. The delivery nodes 530a and 530b are communicatively coupled to the multicast gateway node 404 and the access nodes 410 and 420.

For example, the delivery nodes 530a and 530b correspond to routers, switches, and/or the like.

In some implementations, the IP RAN network 406 (domain 1) includes a first egress interface 532a and a second egress interface 532b. The first egress interface 532a provides an interface between the multicast gateway node 404 and the delivery node 530a. The second egress interface 532b provides an interface between the multicast gateway node 404 and the delivery node 530b. In some implementations, the first egress interface 532a and the second egress interface 532b operate according to the interior gateway protocol (IGP).

In some implementations, a multicast identifier 510 is associated with the access node 410. For example, the multicast gateway node 404 assigns the multicast identifier 510 to the access node 410. In some implementations, the multicast identifier 510 corresponds to a bit-string that identifies the access node 410. For example, the multicast identifier 510 corresponds to a bit indexed explicit replication (BIER) identifier. In some implementations, one bit is set (e.g., "1") at a unique position within the bit-string that identifies the access node 410. For example, as depicted in FIG. 5, the multicast identifier 510 corresponding to the access node 410 is "00010000", where the first four bits (e.g., "0001") are unique to the access node 410.

In some implementations, a multicast identifier 520 is associated with the access node 420. For example, the multicast gateway node 404 assigns the multicast identifier 520 to the access node 420. In some implementations, the multicast identifier 520 corresponds to a bit-string that identifies the access node 420. For example, the multicast identifier 520 corresponds to a BIER identifier. In some implementations, one bit is set (e.g., "1") at a unique position within the bit-string that identifies the access node 420. For example, as depicted in FIG. 5, the multicast identifier 520 corresponding to the access node 420 is "00100000", where the first four bits (e.g., "0010") are unique to the access node 420.

In some implementations, a multicast identifier 514a is associated with the UE 414a. For example, the multicast gateway node 404 assigns the multicast identifier 514a to the UE 414a. In some implementations, the multicast identifier 514a corresponds to a bit-string that identifies the UE 414a. For example, the multicast identifier 514a corresponds to a bit indexed explicit replication (BIER) identifier. In some implementations, two bits are set (e.g., "1") in the bit-string, where the first bit identifies a respective access node in the operator network and the second bit identifies a respective UE within the UE group/domain associated with the respective access node. For example, as depicted in FIG. 5, the multicast identifier 514a corresponding to the UE 414a is "00010001", where the first four bits (e.g., "0001") identify the access node 410 and the last four bits (e.g., "0001") identify the UE 414a within the UE group 412 (domain 2).

In some implementations, a multicast identifier 514b is associated with the UE 414b. For example, the multicast gateway node 404 assigns the multicast identifier 514b to the UE 414b. In some implementations, the multicast identifier 514b corresponds to a bit-string that identifies the UE 414b. For example, the multicast identifier 514b corresponds to a bit indexed explicit replication (BIER) identifier. In some implementations, two bits are set (e.g., "1") in the bit-string, where the first bit identifies a respective access node in the operator network and the second bit identifies a respective UE within the UE group/domain associated with the respective access node. For example, as depicted in FIG. 5, the multicast identifier 514b corresponding to the UE 414b is "00010010", where the first four bits (e.g., "0001") identify the access node 410 and the last four bits (e.g., "0010") identify the UE 414b within the UE group 412 (domain 2).

In some implementations, a multicast identifier 514c is associated with the UE 414c. For example, the multicast gateway node 404 assigns the multicast identifier 514c to the UE 414c. In some implementations, the multicast identifier 514c corresponds to a bit-string that identifies the UE 414c. For example, the multicast identifier 514c corresponds to a bit indexed explicit replication (BIER) identifier. In some implementations, two bits are set (e.g., "1") in the bit-string, where the first bit identifies a respective access node in the operator network and the second bit identifies a respective UE within the UE group/domain associated with the respective access node. For example, as depicted in FIG. 5, the multicast identifier 514c corresponding to the UE 414c is "00010100", where the first four bits (e.g., "0001") identify the access node 410 and the last four bits (e.g., "0100") identify the UE 414c within the UE group 412 (domain 2).

In some implementations, a multicast identifier 524a is associated with the UE 424a. For example, the multicast gateway node 404 assigns the multicast identifier 524a to the UE 424a. In some implementations, the multicast identifier 524a corresponds to a bit-string that identifies the UE 424a. For example, the multicast identifier 524a corresponds to a bit indexed explicit replication (BIER) identifier. In some implementations, two bits are set (e.g., "1") in the bit-string, where the first bit identifies a respective access node in the operator network and the second bit identifies a respective UE within the UE group/domain associated with the respective access node. For example, as depicted in FIG. 5, the multicast identifier 524a corresponding to the UE 424a is "00100001", where the first four bits (e.g., "0010") identify the access node 420 and the last four bits (e.g., "0001") identify the UE 424a within the UE group 422 (domain 3).

In some implementations, a multicast identifier 524b is associated with the UE 424b. For example, the multicast gateway node 404 assigns the multicast identifier 524b to the UE 424b. In some implementations, the multicast identifier 524b corresponds to a bit-string that identifies the UE 424b. For example, the multicast identifier 524b corresponds to a bit indexed explicit replication (BIER) identifier. In some implementations, two bits are set (e.g., "1") in the bit-string, where the first bit identifies a respective access node in the operator network and the second bit identifies a respective UE within the UE group/domain associated with the respective access node. For example, as depicted in FIG. 5, the multicast identifier 524b corresponding to the UE 424b is "00100010", where the first four bits (e.g., "0010") identify the access node 420 and the last four bits (e.g., "0010") identify the UE 424b within the UE group 422 (domain 3).

In some implementations, a multicast identifier is associated with the UE 424c. For example, the multicast gateway node 404 assigns the multicast identifier 524c to the UE 424c. In some implementations, the multicast identifier 524c corresponds to a bit-string that identifies the UE 424c. For example, the multicast identifier 524c corresponds to a bit indexed explicit replication (BIER) identifier. In some implementations, two bits are set (e.g., "1") in the bit-string, where the first bit identifies a respective access node in the operator network and the second bit identifies a respective UE within the UE group/domain associated with the respective access node. For example, as depicted in FIG. 5, the multicast identifier 524c corresponding to the UE 424c is "00100100", where the first four bits (e.g., "0010") identify the access node 420 and the last four bits (e.g., "0100") identify the UE 424c within the UE group 422 (domain 3).

In some implementations, the UE 414a sends a transmission 534 (e.g., a registration request) to the access node 410 that is forwarded to the management node 408. In some implementations, the transmission 534 corresponds to a registration request associated with the UE 414a. In some implementations, the transmission 534 includes a UE ID, multicast identifier, IP address, and/or the like associated with the UE 414a. In some implementations, the UE ID associated with the UE 414a corresponds to a subscriber identity module (SIM), international mobile equipment identity (IMEI), international mobile subscriber identity (IMSI), electronic serial number (ESA), mobile equipment identifier (MEID), media access control (MAC) address, or the like. In some implementations, the transmission 534 also includes a multicast flow join request (e.g., an internet group management protocol (IGMP) join request) associated with the UE 414a. For example, the multicast flow join request indicates that the UE 414a expresses interest in a particular multicast data stream after receiving knowledge of said multicast data stream through an out-of-band process.

In some implementations, the registration request includes a multicast flow capability indicator. For example, the multicast flow capability indicator corresponds to a BIER status flag.

In some implementations, the transmission 534 includes also a session identifier associated with the UE 414a. For example, a mobile access network creates a session for the UE and assigns the session a tunnel endpoint identifier (TEID).

In some implementations, the management node 408 performs some processing on the transmission 534. For example, the management node 408 performs similar operations to that of the MME 208 in FIG. 2. In another example, the management node 408 performs similar operations to that of the AMF 306 in FIG. 3. In some implementations, the management node 408 retains the location information for each user associated with the UE 414a and selects the appropriate multicast gateway within the multicast environment 400 such as the multicast gateway node 404.

In some implementations, the management node 408 forwards the transmission 534 to the multicast gateway node 404. In some implementations, if the transmission 534 does not include the multicast flow capability indicator, the multicast gateway node 404 refrains from determining the multicast identifier for the UE 414a. For example, if a UE 414a without the multicast flow capability indicator expresses interest in a multicast data stream, the multicast gateway node 404 denies the multicast flow join request. In another example, if a UE 414a without the multicast flow capability indicator expresses interest in a multicast data stream, the multicast gateway node 404 serves the UE 414a using other multicast forwarding protocols such as passive intermodulation (PIM), pragmatic general multicast (PGM), or the like. In some implementations, if the transmission 534 includes the multicast flow capability indicator, the multicast gateway node 404 is configured to determine whether the UE 414a is already associated with a multicast identifier.

In some implementations, the multicast gateway node 404 generates a new multicast identifier (e.g., a BIER identifier) for the UE if one is not already associated with a multicast identifier. In some implementations, the multicast gateway node 404 determines whether a multicast identifier (e.g., a BIER identifier), transmitted by the UE, is up to date. In some implementations, after receiving the registration request associated with the UE, the multicast gateway node 404 sends the multicast identifier to the UE and, optionally, other information such as a session identifier, IP address, and/or the like.

In some implementations, the multicast gateway node 404 is configured to build and maintain the multicast identifier table 550. In some implementations, the multicast identifier table 550 includes a plurality of entries 552a-552f that each associate a multicast identifier (e.g., the multicast identifiers 514a-514c, and 524a-524c) with a UE (e.g. UEs 414a-414c and UEs 424a-424c).

In some implementations, each of the plurality of entries 552a-552f of the multicast identifier table 550 optionally also includes other information such as a logical next-hop, a physical next-hop, and/or the like. In some implementations, for example, the multicast identifier table 550 corresponds to a BIER forwarding table.

In some implementations, the multicast identifier table 550 stores an entry 552a associated with the UE 414a. In some implementations, the entry 552a at least includes a UE ID for UE 414a and the multicast identifier 514a (e.g. "00010001") associated with the UE 414a. For example, the UE identifier (ID) for UE 414a corresponds to a SIM, IMEI, IMSI, ESA, MEID, MAC address, or the like associated with the UE 414a. In some implementations, the entry 552a also includes other information such as logical next-hop (e.g., the access node 410) and a physical next-hop (e.g., the first egress interface 532a).

In some implementations, the multicast identifier table 550 stores an entry 552b associated with the UE 414b. In some implementations, the entry 552b at least includes a UE ID for UE 414b and the multicast identifier 514b (e.g. "00010010") associated with the UE 414b. For example, the UE ID for UE 414b corresponds to a SIM, IMEI, IMSI, ESA, MEID, MAC address, or the like associated with the UE 414b. In some implementations, the entry 552b includes other information such as logical next-hop (e.g., the access node 410) and a physical next-hop (e.g., the first egress interface 532a).

In some implementations, the multicast identifier table 550 stores an entry 552c associated with the UE 414c. In some implementations, the entry 552c at least includes a UE ID for UE 414c and the multicast identifier 514c (e.g. "00010100") associated with the UE 414c. For example, the UE ID for UE 414c corresponds to a SIM, IMEI, IMSI, ESA, MEID, MAC address, or the like associated with the UE 414c. In some implementations, the entry 552c also includes other information such as logical next-hop (e.g., the access node 410) and a physical next-hop (e.g., the first egress interface 532a).

In some implementations, the multicast identifier table 550 stores an entry 552d associated with the UE 424a. In some implementations, the entry 552d at least includes a UE ID for UE 424a and the multicast identifier 524a (e.g. "00100001") associated with the UE 424a. For example, the UE ID for UE 424a corresponds to a SIM, IMEI, IMSI, ESA, MEID, MAC address, or the like associated with the UE 424a. In some implementations, the entry 552d also includes other information such as logical next-hop (e.g., the access node 420) and a physical next-hop (e.g., the second egress interface 532b).

In some implementations, the multicast identifier table 550 stores an entry 552e associated with the UE 424b. In some implementations, the entry 552e at least includes a UE ID for UE 424b and the multicast identifier 524b (e.g. "00100010") associated with the UE 424b. For example, the UE ID for UE 424b corresponds to a SIM, IMEI, IMSI, ESA, MEID, MAC address, or the like associated with the UE 424b. In some implementations, the entry 552e also includes other information such as logical next-hop (e.g., the access node 420) and a physical next-hop (e.g., the second egress interface 532b).

In some implementations, the multicast identifier table 550 stores an entry 552f associated with the UE 424c. In some implementations, the entry 552f at least includes a UE for UE 424c and the multicast identifier 524c (e.g. "00100100") associated with the UE 424c. For example, the UE ID for UE 424c corresponds to a SIM, IMEI, IMSI, ESA, MEID, MAC address, or the like associated with the UE 424c. In some implementations, the entry 552f also includes other information such as logical next-hop (e.g., the access node 420) and a physical next-hop (e.g., the second egress interface 532b).

Figure 6:
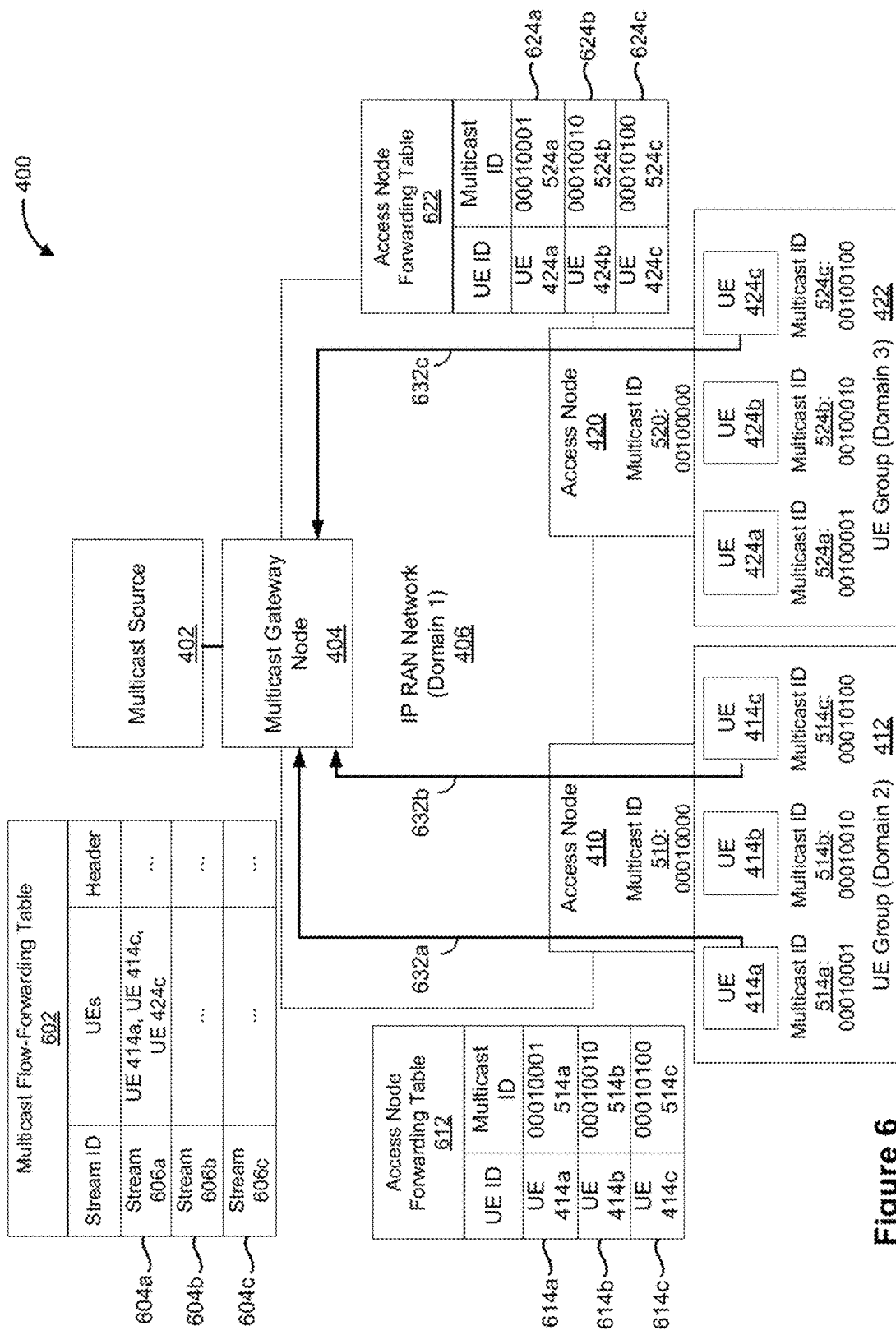
FIG. 6 illustrates operations and data structures associated with the multicast environment illustrated in FIG. 4 in accordance with some implementations.

FIG. 6 illustrates operations and data structures associated with the multicast environment 400 in FIG. 4 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. Elements common to FIGS. 4-5 and FIG. 6 include common reference numbers, and only the differences between FIGS. 4-5 and FIG. 6 are described herein for the sake of brevity. To that end, as a non-limiting example, the multicast environment 400, the multicast gateway node 404 maintains a multicast flow-forwarding table 602, an access node multicast identifier table 612, and an access node multicast identifier table 622.

Generally, FIG. 6 illustrates block diagram representations of a multicast flow-forwarding table and access node multicast identifier tables. In some implementations, each access node maintains its own multicast flow-forwarding table (e.g., BIER forwarding tables that are similar to and adapted from the multicast identifier table 550 in FIG. 5) in order to forward multicast packets to UEs associated with one or more interested users based on the header in the packets.

In some implementations, the multicast gateway node 404 is configured to maintain the multicast flow-forwarding table 602 that includes a plurality of entries 604a-604c that respectively associate a multicast data stream (e.g., the multicast data stream 606a-606c) with UEs associated with interested users (e.g., the UE IDs for the UE 414a, the UE 414c, and the UE 424c in FIG. 6).

In some implementations, the access node 610 is configured to maintain the access node multicast identifier table 612 that includes a plurality of entries 614a-614c that respectively associate a UE (e.g., the UEs 414a-414c) with a multicast identifier (e.g., the multicast identifiers 514a-514c) and/or UE IDs. For example, the entry 614a associates the UE ID for UE 414a with the multicast identifier 514a.

In some implementations, the access node 620 is configured to maintain the access node multicast identifier table 622 that includes a plurality of entries 624a-624c that respectively associate a UE (e.g., the UEs 424a-424c) with a multicast identifier (e.g., the multicast identifiers 524a-524c). For example, the entry 624a associates the UE ID for UE 424a with the multicast identifier 524a.

In some implementations, a transmission 632a from the UE 414a is sent to the access node 410 and forwarded to the multicast gateway node 404. For example, the transmission 632a corresponds to an IGMP join request. In some implementations, the transmission 632a corresponds to a multicast flow join request from the UE 414a that specifies a particular multicast data stream. In some implementations, the transmission 632a includes the multicast identifier 514a and the multicast identifier 510.

In some implementations, a transmission 632b from the UE 414c is sent to the access node 410 and forwarded to the multicast gateway node 404. For example, the transmission 632b corresponds to an IGMP join request. In some implementations, the transmission 632b corresponds to a multicast flow join request from the UE 414c that specifies a particular multicast data stream. In some implementations, the transmission 632b includes the multicast identifier 514c and the multicast identifier 510.

In some implementations, a transmission 632c from the UE 424c is sent to the access node 420 and forwarded to the multicast gateway node 404. For example, the transmission 632c corresponds to an IGMP join request. In some implementations, the transmission 632c corresponds to a multicast flow join request from the UE 424c that specifies a particular multicast data stream. In some implementations, the transmission 632c includes the multicast identifier 524c and the multicast identifier 520.

Figure 7:
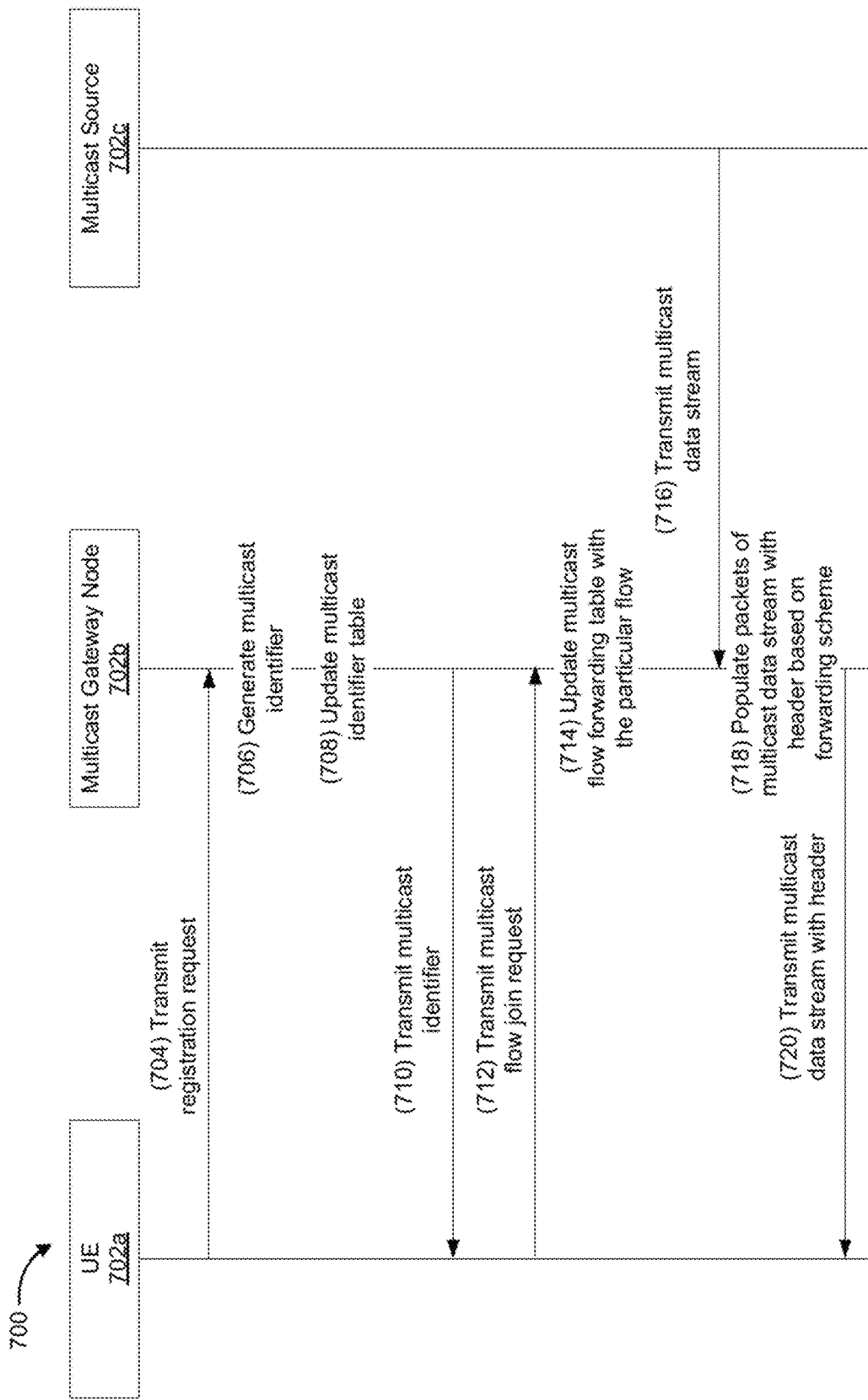
FIG. 7 is a flow diagram of a method of transmitting a multicast data stream in accordance with some implementations.

FIG. 7 is a flow diagram of a method 700 of transmitting a multicast data stream in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the method 700 is associated with a multicast environment (e.g. the multicast environment 400 in FIG. 4). In some implementations, the method 700 is performed at least in part by: a UE 702a (e.g., one of the UEs 414a-414c or the UEs 424a-424c in FIG. 4); a multicast gateway node 702b (e.g., the multicast gateway node 404 in FIG. 4); and a multicast source 702c (e.g., the multicast source 402 in FIG. 4).

In some implementations, the UE 702a transmits (704) a registration request to the multicast gateway node 702b. For example, the registration request is transmitted in a similar fashion as shown by the transmission step 534 in FIG. 5.

In some implementations, in response to receiving the registration request, the multicast gateway node 702b generates (706) a multicast identifier for the UE 702a. For example, as depicted in FIG. 5, the multicast gateway node 404 generates the multicast identifiers 514a-514c and 524a-524c for the UEs 414a-414c and the UEs 424a-424c. For example, as depicted in FIG. 5, the multicast gateway node 404 generates the multicast identifiers 510 and 520 for access nodes 410 and 420, respectively.

In some implementations, after generating the multicast identifier, the multicast gateway node 702b updates (708) a multicast identifier table (e.g., the multicast identifier table 550 in FIG. 5). For example, as depicted in FIG. 5, the multicast gateway node 404 is configured to build and maintain the multicast identifier table 550.

In some implementations, after generating the multicast identifier, the multicast gateway node 702b transmits (710) the multicast identifier to the UE 702a. For example, the multicast identifier corresponds to the multicast identifiers 514a-514c and the multicast identifiers 524a-524c in FIG. 5.

In some implementations, the UE 702a transmits (712) a multicast flow join request to the multicast gateway node 702b. For example, the multicast flow join request is depicted in FIG. 6 as one of the transmissions 632a-632c between the UEs 414a, 414c, and 424c, the access nodes 410 and 420 and the multicast gateway node 404.

In some implementations, after receiving the multicast flow join request, the multicast gateway node 702b updates (714) the multicast flow-forwarding table with a plurality of entries that respectively associate a multicast data stream with a UE. In some implementations, each of the plurality of entries indicate which of the UEs are associated with users interested in the particular multicast data stream. For example, the multicast flow-forwarding table 602 is updated with entries 604a-604c associated with the multicast flow-forwarding table 602 in FIG. 6. In another example, the multicast flow-forwarding table 602 is updated with entries 614a-614c associated with the access node multicast identifier table 612 in FIG. 6. In another example, the multicast flow-forwarding table 602 is updated with entries 624a-624c associated with the access node multicast identifier table 622 in FIG. 6.

In some implementations, the multicast source 702c transmits (716) the multicast data stream to the multicast gateway node 702b. For example, the multicast data stream includes video content, audio content, and/or the like.

In some implementations, in response to receiving the multicast data stream, the multicast gateway node 702b populates (718) packets of the multicast data stream with a header based on the forwarding scheme (e.g., the first forwarding scheme described below in FIG. 8, or the second forwarding scheme described below in FIG. 9). According to some implementations, the header includes a BIER-in-BIER identifier synthesized based at least in part on the UEs associated with interested users in the multicast data stream as indicated by the multicast flow-forwarding table, the access nodes that service said UEs associated with interested users, and the multicast identifiers therefor as indicated by the multicast identifier table. In one example, the header includes a bit-string that identifies a respective access node (e.g., one of the access nodes 410 and 420 in FIG. 4) and one or more UEs associated with interested users serviced by the respective access node (e.g., described in more detail below with respect to the first forwarding scheme shown in FIG. 8). In another example, the header includes a bit-string that identifies one or more access nodes that service UEs associated with interested users and a superset of the UEs associated with interested users (e.g., described in more detail below with respect to the second forwarding scheme shown in FIG. 9).

In some implementations, after populating the packets with the header, the multicast gateway node 702b transmits (720) the multicast data stream with the header to the UE 702a. In some implementations, the multicast data stream combined with the header corresponds to a packet.

Figure 8:
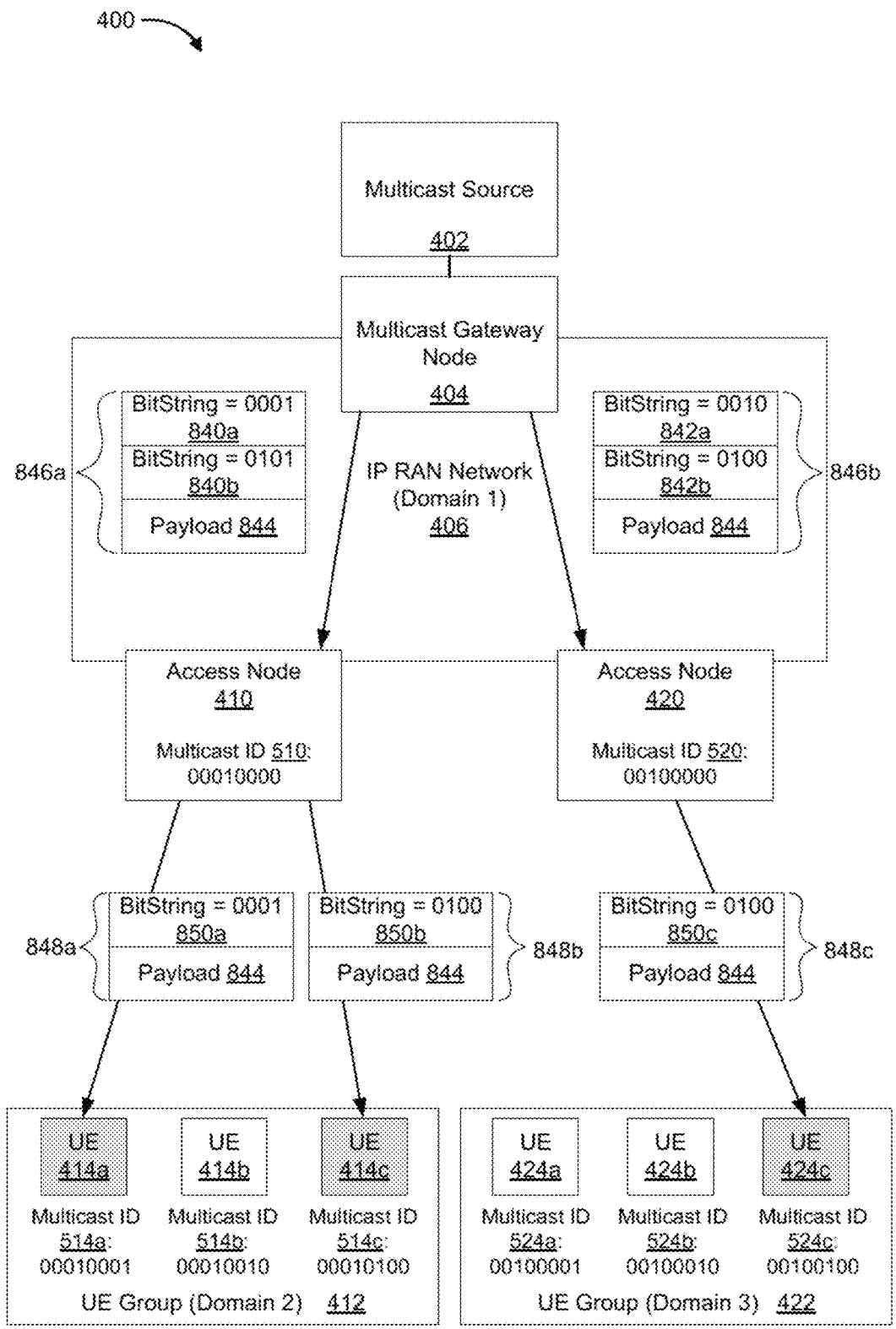
FIG. 8 illustrates operations and data structures associated with the multicast environment illustrated in FIG. 4 in accordance with some implementations.

FIG. 8 illustrates operations and data structures associated with the multicast environment 400 in FIG. 4 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. Elements common to FIG. 4 and FIG. 8 include common reference numbers, and only the differences between FIG. 4 and FIG. 8 are described herein for the sake of brevity. To that end, as a non-limiting example, the multicast environment 400 illustrates a forwarding scheme in which the multicast gateway node 404 forwards a first set of packets associated with the multicast data stream to a first access node with a header tailored to a first access node/UE group and forwards a second set of packets associated with the multicast data stream to a second access node with a header tailored to a second access node/UE group. As such, the multicast gateway node 404 tailors the header on an access node/UE group basis and copies of the multicast data stream are forwarded to each access node serving UEs associated with users interested in the multicast data stream.

According to some implementations, in response to receiving a particular multicast data stream, the multicast gateway node 404 determines which UEs are associated with users interested in the particular multicast data steam based on the multicast flow-forwarding table 602. For example, with reference to the multicast flow-forwarding table 602 in FIG. 6, assuming the multicast data stream corresponds to stream ID 606a, the multicast gateway node 404 determines that UE 414a, UE 414c, and UE 424c are associated with users interested in the multicast data stream. In this example, UE 414a and UE 414c are associated with UE group 412 (domain 2) served by the access node 410, and UE 424c is associated with UE group 422 (domain 3) served by the access node 420.

In some implementations, the multicast gateway node 404 populates a packet 846a destined for access node 410 with a header that includes a first bit-string 840a (e.g., the first header portion) that identifies the access node 410 and a second bit-string 840b (e.g., the second header portion) that identifies UE 414a and UE 414c. The packet 846a further includes a payload 844 associated with the multicast data stream (e.g., the video content, audio content, and/or the like). For example, the multicast gateway node 404 generates the first bit-string 840a (e.g., "0001") based on the first four bits of the multicast identifier 510 associated with the access node 410, or the first four bits of the multicast identifiers 514a or 514c associated with UEs 414a and 414c, respectively. For example, the multicast gateway node 404 generates the second bit-string 840b (e.g., "0101") based on the last four bits of the multicast identifiers 514a and 514c associated with UEs 414a and 414c, respectively.

In some implementations, the multicast gateway node 404 populates a packet 846b destined for access node 420 with a header that includes a first bit-string 842a (e.g., the first header portion) that identifies the access node 420 and a second bit-string 842b (e.g., the second header portion) that identifies UE 424c. The packet 846b further includes the payload 844 associated with the multicast data stream (e.g., the video content, audio content, and/or the like). For example, the multicast gateway node 404 generates the first bit-string 842a (e.g., "0010") based on the first four bits of the multicast identifier 520 associated with the access node 420, or the first four bits of the multicast identifier 524c associated with UE 424c. For example, the multicast gateway node 404 generates the second bit-string 842b (e.g., "0100") based on the last four bits of the multicast identifier 524c associated with UE 424c.

In some implementations, the multicast gateway node 404 forwards a first populated packet 846a to the access node 410 that services the UE group 412 (domain 2) via a first egress interface (e.g., the first egress interface 532a in FIG. 5), and a second populated packet 846b to another access node 420 that services the UE group 422 (domain 3) via a second egress interface (e.g., the second egress interface 532b in FIG. 5). As such, the multicast gateway node 404 forwards a packet (e.g., the packet 846a and the packet 846b) to each access node servicing one or more UEs associated with interested users. As such, in an example where a respective access node services two UEs associated with interested users, the header for the packet corresponding to the respective access node includes 3 set bits out of $2^X$ bits (e.g., number of set bits in this example=1 access node+2 UEs associated with interested users).

In some implementations, the access node 410 servicing the UE group 412 (domain 2) forwards a packet 848a that includes a bit-string 850a and the payload 844. For example, the bit-string 850a includes one set bit (e.g., "0001") that identifies the UE 414a. In another example, the payload 844 includes a portion of a particular multicast data stream.

In some implementations, the access node 410 servicing the UE group 412 (domain 2) forwards a packet 848b that includes a bit-string 850b and the payload 844. For example, the bit-string 850b includes one set bit (e.g., "0100") that identifies the UE 414c. In another example, the payload 844 includes a portion of a particular multicast data stream.

In some implementations, the access node 420 servicing the UE group 422 (domain 3) forwards a packet 848c that includes a bit-string 850c and the payload 844. For example, the bit-string 850c includes one set bit (e.g., "0100") that identifies the UE 424c. In another example, the payload 844 includes a portion of a particular multicast data stream.

Figure 9:
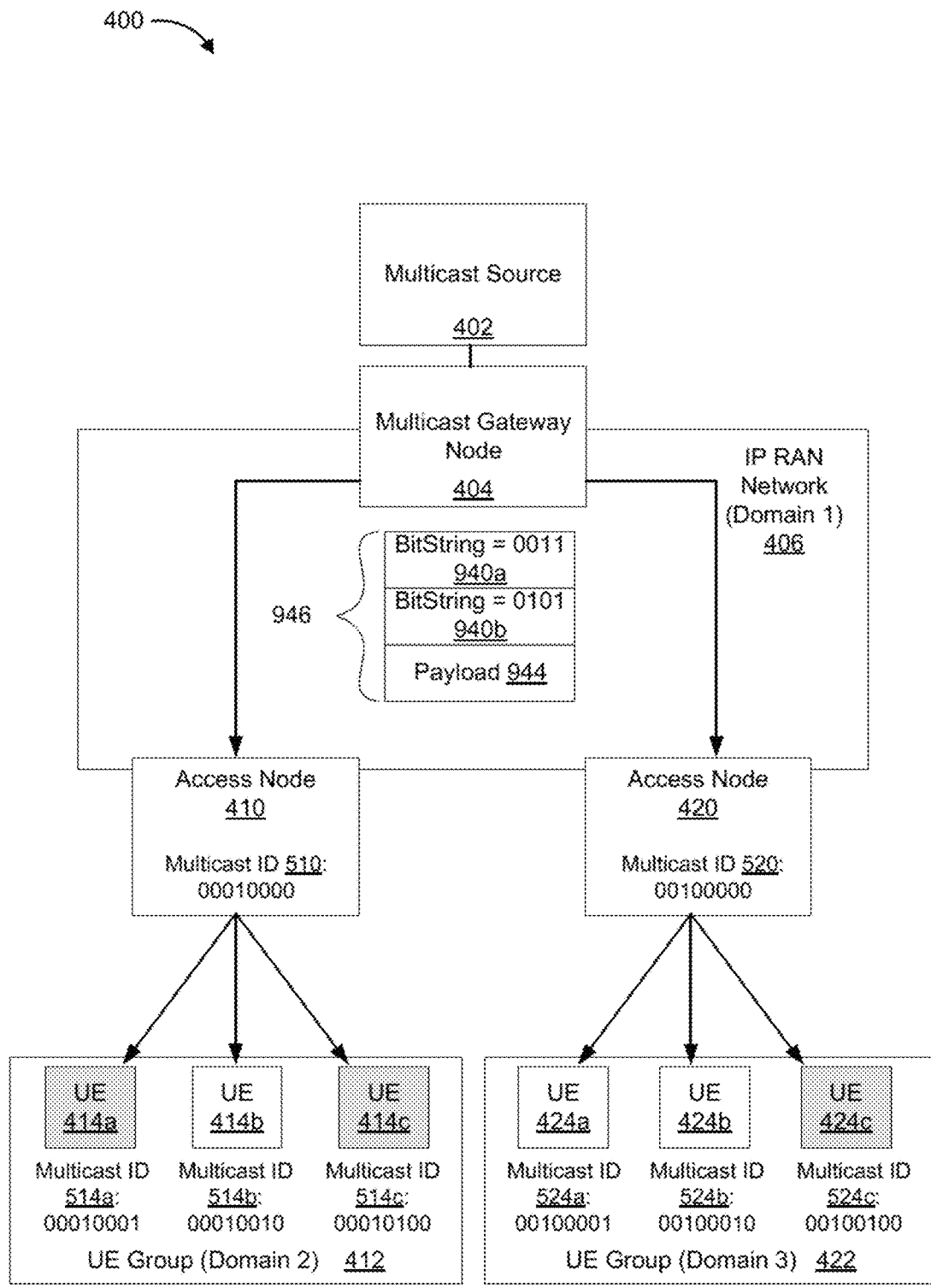
FIG. 9 illustrates operations and data structures associated with the multicast environment illustrated in FIG. 4 in accordance with some implementations.

FIG. 9 illustrates operations and data structures within the multicast environment 400 in FIG. 4 accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. Elements common to FIGS. 4 and 9 include common reference numbers, and only the differences between FIGS. 4 and 9 are described herein for the sake of brevity. To that end, as a non-limiting example, the multicast environment 400 illustrates a forwarding scheme in which the same single multicast data stream is forwarded to all access nodes servicing UEs associated with interested users and a superset of said UEs via associated egress interfaces. As such, in some implementations, the particular multicast data stream is forwarded to some UEs associated with one or more users uninterested in the particular multicast data stream.

In some implementations, the multicast gateway node 404 populates a packet 946 destined for access nodes 410 and 420 with a header that includes a first bit-string 940a (e.g., the first header portion) that identifies the access nodes 410 and 420 and a second bit-string 940b (e.g., the second header portion) that identifies the UE 414a, the UE 414c, and the UE 424c. In some implementations, the packet 946 further includes the payload 944 associated with a portion of the multicast data stream (e.g., the video content, audio content, and/or the like). For example, the multicast gateway node 404 generates the first bit-string 940a (e.g., "0011") based on the first four bits of the multicast identifiers 510 and 520 associated with the access nodes 410 and 420, respectively, or the first four bits of the multicast identifiers 514a, 514c, and 524c associated with the UEs 414a, 414c, and 424c, respectively. For example, the multicast gateway node 404 generates the second bit-string 940b (e.g., "0101") based on a combination of the last four bits of multicast identifiers 514a, 514c, and 524c associated with the UEs 414a, 414c, and 424c, respectively.

In some implementations, each access node in the operator network is associated with a unique bit in the first bit-string. In some implementations, each UE within a UE group is associated with a bit in the second bit-string. As such, in some examples, some overlap of bits in the second bit-string exists between UEs associated with interested users and UEs associated with uninterested users amongst the various access node groups when operating according to the forwarding scheme as illustrated in FIG. 9. As such, in an example where two access nodes that service two and three UEs, respectively, the header for the packet sent to both access nodes includes 5 set bits out of $2^X$ bits (e.g., number of set bits in this example=2 access nodes+max (2 UEs associated with interested users, 3 UEs associated with interested users).

In some implementations, the payload 944 is encrypted with a secret key that is known by UEs associated with interested users (e.g., the UE 414a, the UE 414c, and the UE 424c) but not by UEs associated with uninterested users (e.g., the UE 414b, the UE 424a, and the UE 424b). For example, the UEs associated with interested users obtain the secret key in response to the multicast flow join request. In another example, the users obtain the secret key according to an out-of-band procedure. Therefore, the packets associated with the particular multicast data stream are dropped by UEs associated with uninterested users due to the lack of the secret key to decrypt the payload and non-interest in the particular multicast data stream. However, the UEs associated with interested users have the ability to decrypt the payload associated with the particular multicast data stream.

Figure 10:
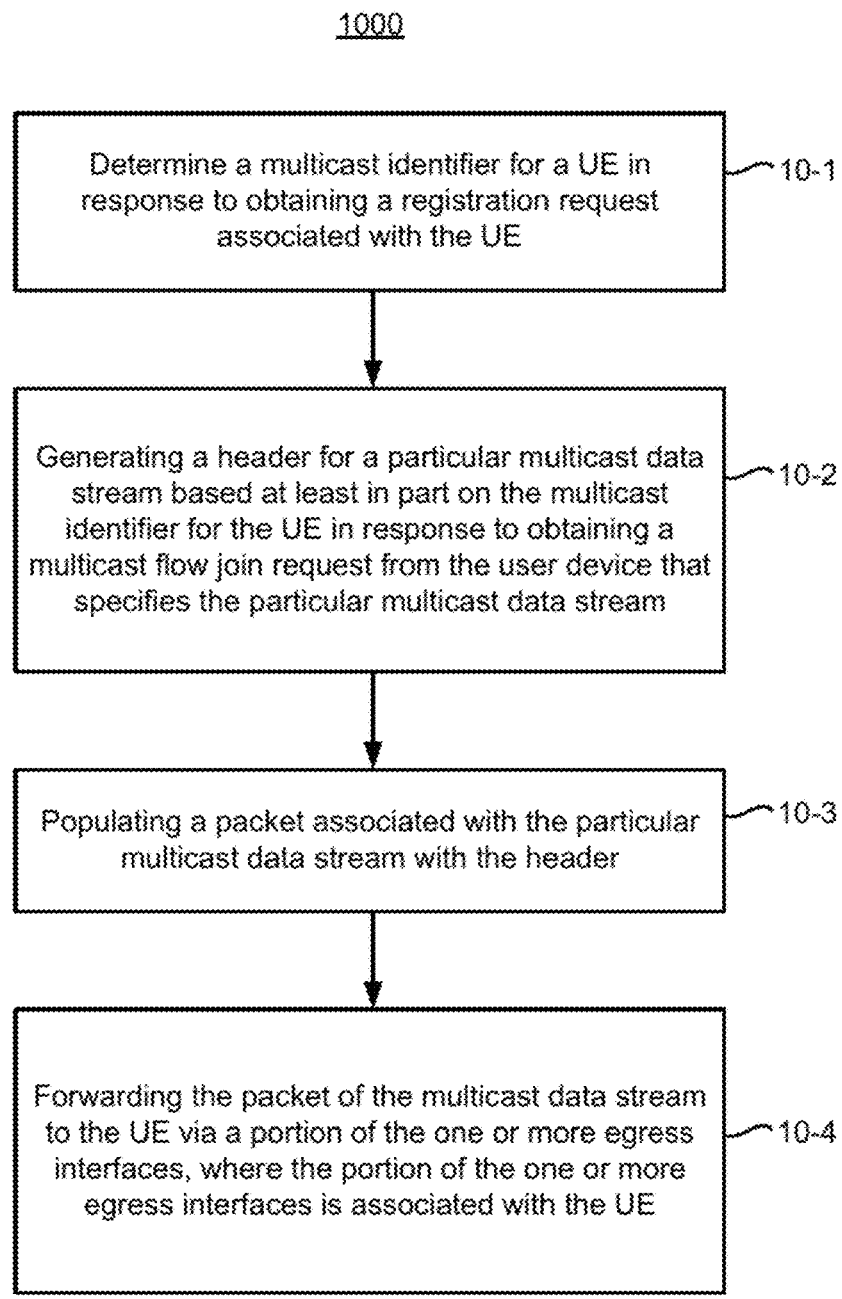
FIG. 10 is a simplified flowchart representation of a method of populating and forwarding a packet associated with a multicast data stream in accordance with some implementations.

FIG. 10 is a simplified flowchart representation of a method 1000 of populating and forwarding a packet associated with a multicast data stream in accordance with some implementations. In various implementations, the method 1000 is performed at a multicast gateway node (e.g., the multicast gateway node 114 of FIG. 1, or the multicast gateway 404 in FIGS. 4-6). While pertinent features are shown, those of ordinary skill in the art will appreciate from the present disclosure that various other features have not been illustrated for the sake of brevity and so as not to obscure more pertinent aspects of the example implementations disclosed herein. To that end, briefly, in some circumstances, the method 1000 includes: determining a multicast identifier for a UE in response to obtaining a registration request associated with the UE; generating a header for a particular multicast data stream based at least in part on the multicast identifier for the UE in response to obtaining a multicast flow join request from the UE that specifies the particular multicast data stream; populating a packet associated with the particular multicast data stream with the header; and forwarding the packet of the multicast data stream to the UE via a portion of the one or more egress interfaces, where the portion of the one or more egress interfaces is associated with the UE.

In some implementations, as represented by block 10-1, the method 1000 optionally includes determining a multicast identifier for a UE in response to obtaining a registration request associated with the UE. For example, the registration request corresponds to a transmission (e.g., the transmission 534 in FIG. 5). In some implementations, the registration request corresponds to an LTE or 5G attach signal workflow. In some implementations, the registration request also includes a multicast flow join request associated with the UE (e.g., the UE 414a). In some implementations, the registration request includes a multicast flow capability indicator.

In some implementations, if the registration request does not include the multicast flow capability indicator, the multicast gateway node 404 refrains from determining the multicast identifier for the UE 414a. For example, if a UE 414a without the multicast flow capability indicator expresses interest in a multicast data stream, the multicast gateway node 404 denies the multicast flow join request. In another example, if a UE 414a without the multicast flow capability indicator expresses interest in a multicast data stream, the multicast gateway node 404 serves the UE 414a using other multicast forwarding protocols such as passive intermodulation (PIM), pragmatic general multicast (PGM), or the like.

In some implementations, if the registration request includes the multicast flow capability indicator, the multicast gateway node 404 is configured to determine whether the UE is already associated with a multicast identifier. In some implementations, the multicast gateway node 404 generates a new multicast identifier (e.g., a BIER identifier) for the UE if one is not already associated with a multicast identifier. In some implementations, the multicast gateway node 404 checks to see if a multicast identifier (e.g., a BIER identifier) transmitted by the UE is up to date. In some implementations, after receiving the registration request associated with the UE, the multicast gateway node 404 sends the multicast identifier to the UE and, optionally, other information such as a session identifier, IP address, and/or the like.

In some implementations, a multicast gateway node (e.g., the multicast gateway node 404 in FIG. 5) is configured to build and maintain a multicast identifier table (e.g., the multicast identifier table 550 in FIG. 5). In some implementations, the multicast identifier table 550 includes a plurality of entries 552*a*-552*f* that each associate a multicast identifier (e.g., the multicast identifiers 514*a*-514*c* and 524*a*-524*c*) with a UE ID (e.g. the UE IDs for the UEs 414*a*-414*c* and the UEs 424*a*-424*c*). For example, a UE ID for UEs 414*c* and UE 424*a*-424*c* corresponds to a SIM, IMEI, IMSI, ESA, MEID, MAC address, or the like. In some implementations, each of the plurality of entries 552*a*-552*f* of the multicast identifier table 550 optionally also includes other information such as a logical next-hop, a physical next-hop, and/or the like.

In some implementations, as represented by block 10-2, the method 1000 includes generating a header for a particular multicast data stream based at least in part on the multicast identifier for the UE in response to obtaining a multicast flow join request from the UE that specifies the particular multicast data stream. For example, the header corresponds to the bit-strings 840*a*-840*b* and 842*a*-842*b* in FIG. 8 or the bit-strings 940*a*-940*b* in FIG. 9. In one example, the header corresponds to a bit-string that implicitly identifies the UE and/or its associated access node. In another example, the particular multicast data stream includes the packet 844 in FIG. 8 or the packet 944 in FIG. 9. In some implementations, a header is generated in response to determining that the particular multicast data stream is available at the ingress interface.

In some implementations, the UE transmits the multicast flow join request (e.g., via IGMP or via multicast listener discovery (MLD)) to the multicast gateway node (e.g., the multicast gateway node 404) expressing interest in a particular multicast flow after receiving knowledge of said multicast flow through an out-of-band process. In some implementations, after receiving the multicast flow join request, the multicast gateway node builds and maintains a multicast flow-forwarding table that associates multicast identifiers with UE IDs and/or multicast identifiers for UEs associated with interested users. For example, with reference to FIG. 6, the multicast gateway node 404 is configured to maintain the multicast flow-forwarding table 602 that includes a plurality of entries 604*a*-604*c* that respectively associate a multicast data streams 606*a*-606*c* with UEs associated with interested users (e.g., the UE 414*a*, the UE 414*c*, and the UE 424*c* are associated with users interested in stream 606*a* in FIG. 6).

In some implementations, in response to receiving the multicast flow join request, the multicast gateway node generates an entry for the multicast flow-forwarding table that links the UE ID for the UE associated with an interested user with the multicast flow identifier for the multicast flow.

In some implementations, the multicast gateway node adds the UE ID for the UE associated with the interested user to a pre-existing entry associated with the multicast flow in the multicast flow-forwarding table that includes other UE IDs for other UEs associated with users that are interested in the particular multicast flow.

In some implementations, the multicast flow join request is separate from the registration request. In some implementations, the multicast flow join request is combined with the registration request. In some implementations, the multicast gateway node obtains (e.g., receives or retrieves) the multicast data stream. In some implementations, the multicast flow join request is received prior to obtaining the multicast data stream.

In some implementations, as represented by block 10-3, the method 1000 includes populating a packet associated with the particular multicast data stream with the header. In some implementations, the packet includes the generated header and a payload associated with the particular multicast data stream. In some implementations, the header corresponds to BIER-in-BIER (e.g., an outer bit-string that identifies an access node and an inner bit-string that identifies one or more UEs serviced by the access node). For example, with reference to FIG. 8, the multicast gateway node 404 populates the packet 846*a* with bit-string 840*a* (e.g., the outer header portion) identifies access node 410 and bit-string 840*b* (e.g., the inner header portion) that identifies UEs associated with interested users (e.g., the UEs 414*a* and 414*c*) serviced by the access node 410. Continuing with this example, the multicast gateway node 404 populates the packet 846*b* with bit-string 842*a* (e.g., the outer header portion) that identifies access node 420 and bit-string 842*b* (e.g., the inner header portion) that identifies the UE 424*c* associated with an interested user serviced by the access node 420. In another example, the multicast gateway node 404 populates the packet 946 destined for access nodes 410 and 420 with bit-string 940*a* (e.g., the outer header portion) that identifies access nodes 410 and 420 and also with bit-string 940*b* (e.g., the inner header portion) that identifies the superset of UEs associated with interested users (e.g., the UEs 414*a*, 414*c*, and 424*c*).

In some implementations, the first and second header portions of the header each include 4, 8, 16, $2^X$ bits. In some implementations, each access node in the operator network is associated with a unique bit in the first header portion. In some implementations, each UE within an access node group or domain is associated with a unique bit in the second header portion.

In some implementations, as represented by block 10-4, the method 1000 includes forwarding the packet of the multicast data stream to the UE via a portion of the one or more egress interfaces, where the portion of the one or more egress interfaces is associated with the UE. For example, the multicast stream is forwarded within a data plane of the operator network (e.g., at the UPF 316 which is within the data plane in FIG. 3). In some implementations, the UE corresponds to an access node (e.g., an eNodeB or microcell).

In some implementations, a forwarding scheme exists in which the multicast gateway node 404 forwards a first set of packets associated with the multicast data stream to a first access node with a header tailored to a first access node/UE group and forwards a second set of packets associated with the multicast data stream to a second access node with a header tailored to a second access node/UE group. As such, the multicast gateway node 404 tailors the header on an access node/UE group basis and copies of the multicast data stream are forwarded to each access node serving UEs associated with users interested in the multicast data stream. For example, FIG. 8 illustrates the aforementioned forwarding scheme.

In some implementations, a forwarding scheme exists in which the same single multicast data stream is forwarded to all access nodes and all UEs via associated egress interfaces. As such, in some implementations, the particular multicast data stream is forwarded to some UEs associated with one or more users uninterested in the particular multicast data stream. For example, FIG. 9 illustrates the aforementioned forwarding scheme.

Figure 11:
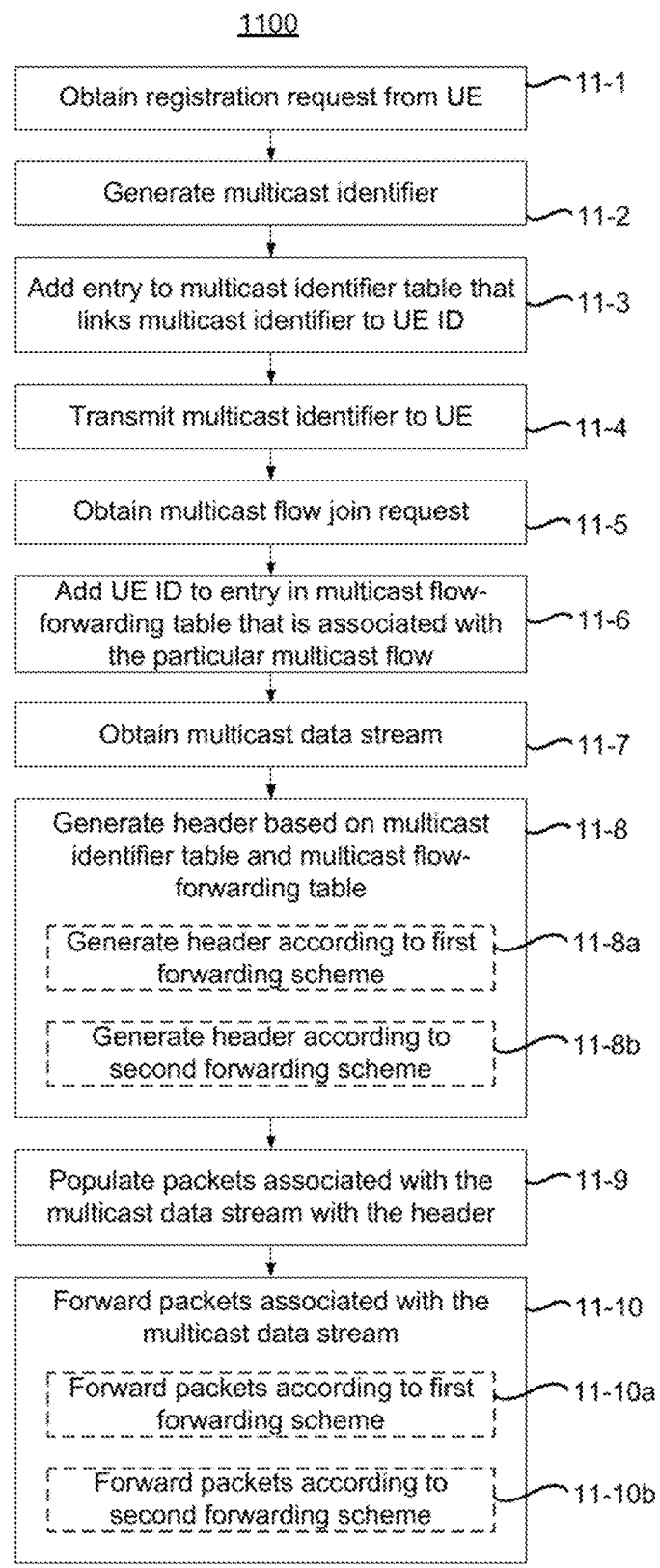
FIG. 11 is a flowchart representation of a method of populating and forwarding a packet associated with a multicast data stream according to one of a forwarding scheme in accordance with some implementations.

FIG. 11 is a flowchart representation of a method 1100 of populating and forwarding a packet associated with a multicast data stream according to one of a forwarding scheme in accordance with some implementations. In various implementations, the method 1100 is performed at a multicast gateway node (e.g., the multicast gateway node 114 of FIG. 1, or the multicast gateway 404 in FIGS. 4, 5 and 6). While pertinent features are shown, those of ordinary skill in the art will appreciate from the present disclosure that various other features have not been illustrated for the sake of brevity and so as not to obscure more pertinent aspects of the example implementations disclosed herein. To that end, briefly, in some circumstances, the method 1100 includes: obtaining a registration request from a UE; generating a multicast identifier; adding an entry to the multicast identifier table that links the multicast identifier to the UE identifier; transmitting the multicast identifier to the UE; obtaining the multicast flow join request; adding the UE to the entry in the multicast flow-forwarding table that is associated with the particular multicast flow; obtaining the multicast data stream; generating a header based on the multicast identifier table and the multicast flow-forwarding table; populating packets associated with the multicast data stream with the header; and forwarding packets associated with the multicast data stream.

In some implementations, as represented by block 11-1, the method 1100 includes obtaining a registration request from a UE (e.g., the UEs 414a-414c and the UEs 424a-424c in FIG. 4). For example, with reference to FIG. 7, the UE 702a transmits (704) a registration request to the multicast gateway node 702b. In another example, the registration request is transmitted in a similar fashion as shown by the transmission 534 in FIG. 5. In some implementations, the registration request includes a UE ID, multicast identifier, IP address, and/or the like. In some implementations, the UE ID associated with the UE 414a corresponds to a SIM, IMEI, IMSI, ESA, MEID, MAC address, or the like.

In some implementations, the registration request includes a multicast flow capability indicator. For example, the multicast flow capability indicator corresponds to a BIER status flag. In some implementations, the registration request includes a session identifier associated with the UE 414a. For example, a mobile access network creates a session for the UE and assigns the session a tunnel endpoint identifier (TEID).

In some implementations, if the registration request does not include the multicast flow capability indicator, the multicast gateway node 404 refrains from determining the multicast identifier for the UE 414a. For example, if a UE 414a without the multicast flow capability indicator expresses interest in a multicast data flow, the multicast gateway node 404 denies the multicast flow join request. In another example, if a UE 414a without the multicast flow capability indicator expresses interest in a multicast data stream, the multicast gateway node 404 serves the UE 414a using other multicast forwarding protocols such as PIM, PGM, or the like.

In some implementations, if the registration request includes the multicast flow capability indicator, the multicast gateway node 404 is configured to determine whether the UE is already associated with a multicast identifier. In some implementations, the multicast gateway node 404 generates a new multicast identifier (e.g., a BIER identifier) for the UE if one is not already associated with a multicast identifier. In some implementations, the multicast gateway node 404 checks to see if a multicast identifier (e.g., a BIER identifier) transmitted by the UE is up to date. In some implementations, as represented by block 11-2, the method 1100 includes generating a multicast identifier. For example, with reference to FIG. 7, the multicast gateway node 702b generates (706) a multicast identifier. In one example, with reference to FIG. 5, the multicast gateway node 404 generates the multicast identifiers 514a-514c and 524a-524c for UE 414a-414c and UE 424a-424c. In some implementations, the multicast gateway node 404 generates a new multicast identifier (e.g., a BIER identifier) for the UE if one is not already associated with it. In some implementations, the multicast gateway node 404 checks to see if a multicast identifier (e.g., a BIER identifier) transmitted by the UE is up to date (e.g., via the multicast identifier table 550 in FIG. 5). In some implementations, after receiving the registration request associated with the UE, the multicast gateway node 404 sends the multicast identifier to the UE and, optionally, other information such as a session identifier, IP address, and/or the like.

In some implementations, as represented by block 11-3, the method 1100 includes adding an entry to the multicast identifier table that links the multicast identifier to the UE ID. For example, with reference to FIG. 7, the multicast gateway node 702b updates (708) a multicast identifier table. In another example, the multicast identifier table corresponds to the multicast identifier table 550 in FIG. 5. In some implementations, with reference to FIG. 5, the multicast gateway node 404 is configured to build and maintain the multicast identifier table 550. In some implementations, the multicast identifier table 550 includes a plurality of entries 552a-552f that each associate a multicast identifier (e.g., the multicast identifiers 514a-514c, and 524a-524c) with a UE ID (e.g. the UE IDs for the UEs 414a-414c and UEs 424a-424c).

In some implementations, each of the plurality of entries 552a-552f of the multicast identifier table 550 optionally also includes other information such as a logical next-hop, a physical next-hop, and/or the like. In some implementations, for example, the multicast identifier table 550 corresponds to a BIER forwarding table.

In some implementations, as represented by block 11-4, the method 1100 includes transmitting the multicast identifier to the UE. For example, with reference to FIG. 7, the multicast gateway node 702b transmits (710) the multicast identifier to the UE 702a and, optionally, other information such as a session identifier, IP address, and/or the like.

In some implementations, as represented by block 11-5, the method 1100 includes obtaining the multicast flow join request. In some implementations, the UE transmits the multicast flow join request (e.g., via IGMP or via MLD) to the multicast gateway node expressing interest in a particular multicast data flow after receiving knowledge of said multicast data flow through an out-of-band process. For example, with reference to FIG. 7, the UE 702a transmits (712) a multicast flow join request to the multicast gateway node 702b. In another example, the multicast flow join request is depicted in FIG. 5 as transmission 534 between the UE 414a, the access node 410, and the management node 408.

In some implementations, as represented by block 11-6, the method 1100 includes adding the UE ID to an entry in the multicast flow-forwarding table that is associated with the particular multicast flow. For example, adding the UE ID to the entry in the multicast flow-forwarding table is added in a similar fashion as shown in FIG. 6. In some implementations, each access node maintains its own multicast flow-forwarding table (e.g., BIER forwarding tables that are similar to and adapted from the multicast identifier table 550 in FIG. 5) in order to forward multicast packets to UEs associated with interested users based on the header in the packets.

In some implementations, with reference to FIG. 6, the multicast gateway node 404 is configured to maintain the multicast flow-forwarding table 602 that includes a plurality of entries 604a-604c that respectively associate a multicast data stream (e.g., the multicast data stream 606a-606c) with a UE (e.g., the UE 414a, the UE 414c, and the UE 424c).

As one example, with reference to FIG. 6, a transmission 632a from the UE 414a is sent to the access node 410 and forwarded to the multicast gateway node 404. For example, the transmission 632a corresponds to an IGMP join request. In some implementations, the transmission 632a corresponds to a multicast flow join request from the UE 414a that specifies a particular multicast data stream. In some implementations, the transmission 632a includes the multicast identifier 514a and the multicast identifier 510.

In some implementations, as represented by block 11-7, the method 1100 includes obtaining the multicast data stream. For example, with reference to FIG. 7, the multicast source 702c transmits (716) the multicast data stream to the multicast gateway node 702b. For example, the multicast data stream includes video, audio, and/or the like.

In some implementations, as represented by block 11-8, the method 1100 includes generating a header based on the multicast identifier table and the multicast flow-forwarding table. In some implementations, the packet includes the generated header and a payload associated with the particular multicast data stream. In some implementations, the header corresponds to BIER-in-BIER (e.g., an outer bit-string that identifies an access node and an inner bit-string that identifies one or more UEs serviced by the access node). For example, with reference to FIG. 8, the multicast gateway node 404 populates the packet 846a with bit-string 840a (e.g., the outer header portion) identifies access node 410 and bit-string 840b (e.g., the inner header portion) that identifies UEs associated with interested users (e.g., the UEs 414a and 414c) serviced by the access node 410. Continuing with this example, the multicast gateway node 404 populates the packet 846b with bit-string 842a (e.g., the outer header portion) identifies access node 420 and bit-string 842b (e.g., the inner header portion) that identifies the UE 424c associated with an interested user serviced by the access node 420. For example, with reference to FIG. 8, the multicast gateway node 404 populates the packet 846a-846b destined for access nodes 410 and 420, respectively. In one example, the multicast gateway node 404 populates the packet 846a with the headers 840a-840b and populates the packet 846b with the headers 842a-842b. In another example, the multicast gateway node 404 populates the packet 946 destined for access nodes 410 and 420 with bit-string 940a (e.g., the outer header portion) that identifies access nodes 410 and 420 and also with bit-string 940b (e.g., the inner header portion) that identifies the superset of the UEs associated with interested users (e.g., the UEs 414a, 414c, and 424c).

In some implementations, the first and second header portions of the header each include 4, 8, 16, $2^X$ bits. In some implementations, each access node in the operator network is associated with a unique bit in the first header portion. In some implementations, each UE within an access node group or domain is associated with a unique bit in the second header portion.

In some implementations, the multicast gateway node populates packets of the multicast data stream with the header tailored to UEs associated with interested users according to one of a forwarding scheme. For example, with reference to FIG. 8, the header is generated according to a first forwarding scheme. In another example, with reference to FIG. 9, the header is generated according to a second forwarding scheme.

In some implementations, as represented by block 11-8a, the method 1100 includes generating a header according to a first forwarding scheme. For example, the first forwarding scheme corresponds to the forwarding scheme illustrated in FIG. 8. In some implementations, with respect to the first forwarding scheme, the multicast gateway node 404 generates a first header portion (e.g., the bit-string 840a in FIG. 8) tailored to a first access node/UE group (e.g., the access node 410 and the UE group 412 (domain 2) in FIG. 4) and a second header portion (e.g., the bit-string 842a in FIG. 8) tailored to a second access node/UE group (e.g., the access node 420 and the UE group 422 (domain 3) in FIG. 4).

In some implementations, as represented by block 11-8b, the method 1100 includes generating a header according to a second forwarding scheme. For example, the second forwarding scheme corresponds to the forwarding scheme illustrated in FIG. 9. In some implementations, with respect to the second forwarding scheme, the multicast gateway node 404 generates a header portion (e.g., the bit-string 940a in FIG. 9) tailored to forward the same single multicast data stream to all access nodes (e.g., the access nodes 410 and 420 in FIG. 9).

In some implementations, as represented by block 11-9, the method 1100 includes populating packets associated with the multicast data stream with the header. For example, with reference to FIG. 8, the packets are populating according to a forwarding scheme in which a particular multicast data stream is forwarded to a specific access node and then forwarded on to a specific UE. In another example, with reference to FIG. 9, the packets are populated according to a forwarding scheme in which the same single multicast data stream is forwarded to all access nodes and all UEs via associated egress interfaces. As such, some UEs associated with one or more uninterested users may also receive the particular multicast data stream.

In some implementations, as represented by block 11-10, the method 1100 includes forwarding packets associated with the multicast data stream. For example, with reference to FIG. 7, the multicast gateway node 702b transmits (720) the multicast data stream with the header to the UE 702a. In some implementations, the multicast data stream combined with the header corresponds to a packet.

In some implementations, as represented by block 11-10a, the method 1100 includes forwarding packets according to the first forwarding scheme. For example, the first forwarding scheme corresponds to the forwarding scheme illustrated in FIG. 8. In some implementations, with respect to the first forwarding scheme, the multicast gateway node 404 forwards copies of the multicast data stream (e.g., the payload 844 in FIG. 8) to a first access node (e.g., the access node 410 in FIG. 4) serving a first UE group (e.g., the UE group 412 (domain 2) in FIG. 4) associated with users interested in the multicast data stream and forwards copies of the multicast data stream (e.g., the payload 844 in FIG. 8) to a second access node (e.g., the access node 420 in FIG. 4) serving a second UE group (e.g., the UE group 422 (domain 3) in FIG. 4) associated with users interested in the multicast data stream.

In some implementations, as represented by block 11-10b, the method 1100 includes forwarding packets according to the second forwarding scheme. For example, the second forwarding scheme corresponds to the forwarding scheme illustrated in FIG. 9. In some implementations, with respect to the second forwarding scheme, the multicast gateway node 404 forwards copies of the same single multicast data stream (e.g., the payload 944 in FIG. 9) to all access nodes (e.g., the access nodes 410 and 420 in FIG. 4) serving all UE groups (e.g., the UE group 412 (domain 2) and the UE group 422 (domain 3) via associated egress interfaces. As such, in some implementations, the particular multicast data stream is forwarded to some UEs associated with one or more users uninterested in the particular multicast data stream.

Figure 12:
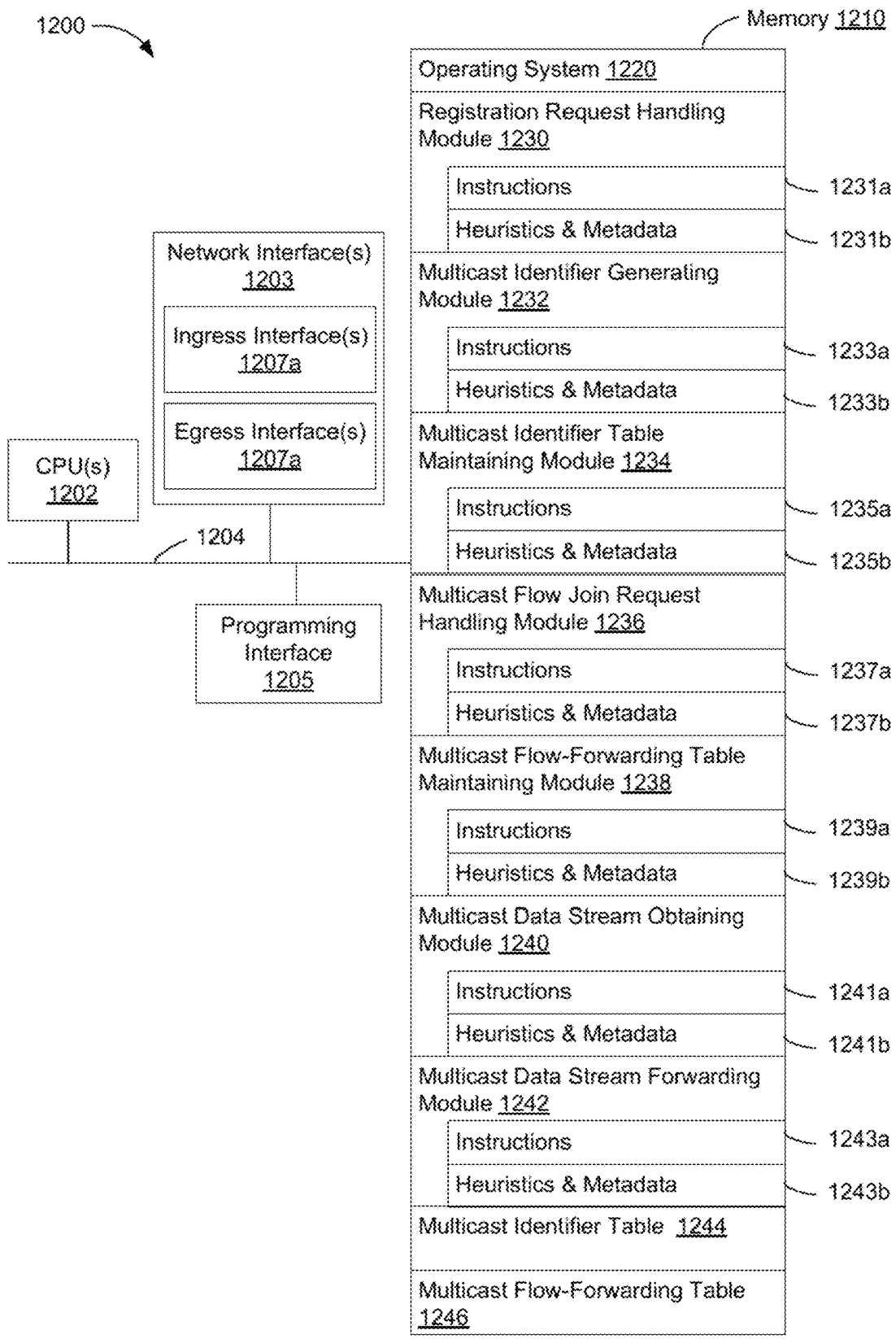
FIG. 12 is a block diagram of an example device in accordance with some implementations.

FIG. 12 is a block diagram of an example device 1200 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the device 1200 corresponds to the multicast gateway node 110 in FIG. 1 or the multicast gateway node 404 in FIG. 4-6. In some implementations, the device 1200 includes one or more processing units (CPUs) 1202, a network interface 1203 with one or more ingress interfaces 1207a and one or more egress interfaces 1207b, a programming (I/O) interface 1205, a memory 1210, and one or more communication buses 1204 for interconnecting these and various other components.

In some implementations, the one or more communication buses 1204 include circuitry that interconnects and controls communications between system components.

In some implementations, the programming interface 1205 includes a set of subroutine definitions, protocols, tools, and/or the like for communications between system components.

The memory 1210 includes high-speed random-access memory, such as DRAM, SRAM, DDR RAM, or other random access solid-state memory devices. In some implementations, the memory 1210 includes non-volatile memory, such as one or more magnetic disk storage devices, optical disk storage devices, flash memory devices, or other non-volatile solid-state storage devices. The memory 1210 optionally includes one or more storage devices remotely located from the one or more CPUs 1202. The memory 1210 comprises a non-transitory computer readable storage medium. In some implementations, the memory 1210 or the non-transitory computer readable storage medium of the memory 1210 stores the following programs, modules and data structures, or a subset thereof including an optional operating system 1220, a registration request handling module 1230, a multicast identifier generating module 1232, a multicast identifier table maintaining module 1234, a multicast flow join request handling module 1236, a multicast flow-forwarding table maintaining module 1238, a multicast data stream obtaining module 1240, a multicast data stream forwarding module 1242, a multicast identifier table 1244, and a multicast flow-forwarding table 1246.

The operating system 1220 includes procedures for handling various basic system services and for performing hardware dependent tasks.

In some implementations, the registration request handling module 1230 is configured to obtain a registration request from the UE. For example, with reference to FIG. 7, the multicast gateway node 404 and the management module 408 are configured to obtain and transmit the registration request from the UE. To that end, in various implementations, the registration request handling module 1230 includes instructions and/or logic 1231a, and heuristics and metadata 1231b.

In some implementations, the multicast identifier generating module 1232 is configured to generate a multicast identifier. To that end, in various implementations, the multicast identifier generating module 1232 includes instructions and/or logic 1233a, and heuristics and metadata 1233b.

In some implementations, the multicast identifier table maintaining module 1234 is configured to update and maintain the multicast identifier table (e.g., the multicast identifier table 550 in FIG. 5). For example, the multicast identifier table maintaining module 1234 corresponds to the multicast gateway node 404. To that end, in various implementations, the multicast identifier table maintaining module 1234 includes instructions and/or logic 1235a, and heuristics and metadata 1235b.

In some implementations, the multicast flow join request handling module 1236 is configured to obtain a multicast flow join request. To that end, in various implementations, the multicast flow join request handling module 1236 includes instructions and/or logic 1237a, and heuristics and metadata 1237b.

In some implementations, the multicast flow-forwarding table maintaining module 1238 is configured to update and maintain the multicast flow-forwarding table (e.g., the multicast flow-forwarding table 602 in FIG. 6). To that end, in various implementations, the multicast flow-forwarding table maintaining module 1238 includes instructions and/or logic 1239a, and heuristics and metadata 1239b.

In some implementations, the multicast data stream obtaining module 1240 is configured to obtain the multicast data stream from a multicast source. To that end, in various implementations, the multicast data stream obtaining module 1240 includes instructions and/or logic 1241a, and heuristics and metadata 1241b.

In some implementations, the multicast data stream forwarding module 1242 is configured to generate a header for packets of the multicast data stream based on the multicast identifier table 1244 and the multicast flow-forwarding table 1246. In some implementations, the multicast data stream forwarding module 1242 is also configured to forward the packets of the multicast data stream that include the header based on one of the forwarding schemes (e.g., the first forwarding scheme described with reference to FIG. 8, or the second forwarding scheme described with reference to FIG. 9). To that end, in various implementations, the multicast data stream forwarding module 1242 includes instructions and/or logic 1243a, and heuristics and metadata 1243b.

In some implementations, the multicast identifier table 1244 is configured to store a plurality of entries that respectively associate multicast identifiers (e.g., the multicast identifiers 514a-514c, and 524a-524c) with UE IDs. For example, with reference to FIG. 5, the multicast identifier table 550 includes entries 552a-552f.

In some implementations, the multicast flow-forwarding table 1246 is configured to store a plurality of entries that respectively associate a multicast flow (or an identifier therefor) with one or more UEs associated with interested users. For example, with reference to FIG. 6, the multicast flow-forwarding table 602 includes entries 604a-604c.

Although the registration request handling module 1230, the multicast identifier generating module 1232, the multicast identifier table maintaining module 1234, the multicast flow join request handling module 1236, the multicast flow-forwarding table maintaining module 1238, the multicast data stream obtaining module 1240, the multicast data stream forwarding module 1242, the multicast identifier table 1244, and the multicast flow-forwarding table 1246 are shown as residing on a single device (e.g., the device 1200), it should be understood that in other implementations, any combination of the registration request handling module 1230, the multicast identifier generating module 1232, the multicast identifier table maintaining module 1234, the multicast flow join request handling module 1236, the multicast flow-forwarding table maintaining module 1238, the multicast data stream obtaining module 1240, the multicast data stream forwarding module 1242, the multicast identifier table 1244, and the multicast flow-forwarding table 1246 reside in separate computing devices.

Moreover, FIG. 12 is intended more as functional description of the various features which be present in a particular implementation as opposed to a structural schematic of the implementations described herein. As recognized by those of ordinary skill in the art, items shown separately could be combined and some items could be separated. For example, some functional modules shown separately in FIG. 12 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method implemented by a multicast gateway node within an operator network, the method comprising:
    determining, by the multicast gateway node, a multicast identifier for a user device in response to obtaining a registration request associated with the user device, wherein the multicast gateway node includes one or more processors, non-transitory memory, a programming interface, one or more ingress interfaces, and one or more egress interfaces;
    generating, by the multicast gateway node, a header for a particular multicast data stream based at least in part on the multicast identifier for the user device in response to obtaining a multicast flow join request from the user device that specifies the particular multicast data stream, the generating the header for the particular multicast data stream includes determining a first header portion identifying an access node that services the user device and determining a second header portion identifying the user device;
    populating, by the multicast gateway node, a packet associated with the particular multicast data stream with the header; and
    forwarding, by the multicast gateway node, the packet of the particular multicast data stream to the user device via a portion of the one or more egress interfaces, wherein the portion of the one or more egress interfaces is associated with the user device.

2. The method of claim 1, wherein the first header portion further identifies one or more other access nodes and the second header portion further identifies one or more other user devices associated with an interested user serviced by the one or more other access nodes, and
    wherein forwarding the packet of the particular multicast data stream to the user device includes:
        forwarding the packet of the particular multicast data stream to the user device via the portion of the one or more egress interfaces associated with the user device; and forwarding the packet of the particular multicast data stream to the user device via another portion of the one or more egress interfaces associated with the one or more other access nodes.

3. The method of claim 2, further comprising transmitting a decryption key associated with the particular multicast data stream to the user device in response to obtaining the multicast flow join request from the user device that specifies the particular multicast data stream.

4. The method of claim 1, wherein the determining the multicast identifier for the user device is in response to determining that the registration request includes a multicast flow capability indicator.

5. The method of claim 1, wherein the registration request includes a first identifier associated with the user device, and a second identifier associated with the access node that services the user device, and
wherein the multicast identifier for the user device is determined based at least in part on the first identifier and the second identifier.

6. The method of claim 5, further comprising updating a multicast identifier table to respectively associate the first identifier with the user device with the multicast identifier.

7. The method of claim 5, further comprising transmitting the multicast identifier to at least one of the access node that services the user device or the user device.

8. The method of claim 1, further comprising:
obtaining the multicast flow join request from the user device, wherein the multicast flow join request includes a multicast flow identifier of the particular multicast data stream; and
in response to obtaining the multicast flow join request from the user device, updating a multicast flow-forwarding table to associate the user device with the multicast flow identifier.

9. The method of claim 1 further comprising:
determining whether the particular multicast data stream is available at an ingress interface from among the one or more ingress interfaces; and
wherein the header is generated in response to the determining that the particular multicast data stream is available at the ingress interface.

10. The method of claim 1, wherein the multicast identifier for the user device corresponds to a bit index explicit replication (BIER) identifier.

11. The method of claim 1, further comprising, obtaining the registration request associated with the user device, wherein the registration request corresponds to an attach signal received from a mobility management entity (MME) node within the operator network.

12. The method of claim 1, further comprising obtaining the registration request associated with the user device, wherein the registration request corresponds to an attach signal received from an access mobility management function (AMF) node within a control plane of the operator network.

13. The method of claim 1, wherein the portion of the one or more egress interfaces is associated with the access node that services the user device.

14. The method of claim 1, wherein the generating the header for the particular multicast data stream is based on a multicast identifier table storing the multicast identifier for the user device and another multicast identifier for the access node and based on a multicast flow-forwarding table that associates the user device with the particular multicast data stream.

15. A device comprising:
a multicast gateway node;
an ingress interface;
one or more egress interfaces;
one or more processors;
a non-transitory memory; and
one or more programs stored in the non-transitory memory, which, when executed by the one or more processors, cause the device to:
determine a multicast identifier for a user device in response to obtaining a registration request associated with the user device;
generate a header for a particular multicast data stream based at least in part on the multicast identifier for the user device in response to obtaining a multicast flow join request from the user device that specifies the particular multicast data stream, the header for the particular multicast data stream is generated by determining a first header portion identifying an access node that services the user device and by determining a second header portion identifying the user device;
populate a packet associated with the particular multicast data stream with the header; and
forward the packet of the particular multicast data stream to the user device via a portion of the one or more egress interfaces, wherein the portion of the one or more egress interfaces is associated with the user device.

16. The device of claim 15, wherein the first header portion further identifies one or more other access nodes and the second header portion further identifies one or more other user devices associated with an interested user serviced by the one or more other access nodes, and
wherein the packet of the particular multicast data stream is forwarded to the user device by:
forwarding the packet of the particular multicast data stream to the user device via the portion of the one or more egress interfaces associated with the user device; and
forwarding the packet of the particular multicast data stream to the user device via another portion of the one or more egress interfaces associated with the one or more other access nodes.

17. The device of claim 15, wherein:
the registration request includes a first identifier associated with the user device, and a second identifier associated with the access node that services the user device,
the multicast identifier for the user device is determined based at least in part on the first identifier and the second identifier, and
the multicast identifier is transmitted to at least one of the access node that services the user device or the user device.

18. A non-transitory memory storing one or more programs, which, when executed by one or more processors of a device, cause the device to:
at a multicast gateway node within an operator network, the multicast gateway node including one or more processors, non-transitory memory, an ingress interface, and one or more egress interfaces:
determine a multicast identifier for a user device in response to obtaining a registration request associated with the user device;
generate a header for a particular multicast data stream based at least in part on the multicast identifier for the user device in response to obtaining a multicast flow join request from the user device that specifies the particular multicast data stream, the header for the particular multicast data stream is generated by determining a first header portion identifying an access node that services the user device and by determining a second header portion identifying the user device;

populate a packet associated with the particular multicast data stream with the header; and forward the packet of the particular multicast data stream to the user device via a portion of the one or more egress interfaces, wherein the portion of the one or more egress interfaces is associated with the user device.

19. The non-transitory memory of claim 18, wherein the first header portion further identifies one or more other access nodes and the second header portion further identifies one or more other user devices associated with an interested user serviced by the one or more other access nodes, and wherein the packet of the particular multicast data stream is forwarded to the user device by:

forwarding the packet of the particular multicast data stream to the user device via the portion of the one or more egress interfaces associated with the user device; and forwarding the packet of the particular multicast data stream to the user device via another portion of the one or more egress interfaces associated with the one or more other access nodes.

20. The non-transitory memory of claim 18, wherein:

the registration request includes a first identifier associated with the user device, and a second identifier associated with the access node that services the user device, the multicast identifier for the user device is determined based at least in part on the first identifier and the second identifier, and the multicast identifier is transmitted to at least one of the access node that services the user device or the user device.

* * * * *